(12) United States Patent
Miller

(10) Patent No.: US 7,058,479 B2
(45) Date of Patent: Jun. 6, 2006

(54) IRRIGATION CONTROLLER

(76) Inventor: Robert Miller, 4955 Coolbrook Ave, Montreal, Quebec (CA) H3X 2K8

( * ) Notice: Subject to any disclaimer, the term of this patent is extended or adjusted under 35 U.S.C. 154(b) by 0 days.

(21) Appl. No.: 11/044,230

(22) Filed: Jan. 28, 2005

(65) Prior Publication Data

US 2005/0171646 A1 Aug. 4, 2005

Related U.S. Application Data

(60) Provisional application No. 60/539,975, filed on Jan. 30, 2004.

(51) Int. Cl.
*G05D 7/00* (2006.01)

(52) U.S. Cl. .......................... 700/284; 239/69

(58) Field of Classification Search ................. 700/283, 700/284, 15, 16, 17, 18, 19, 282; 239/63, 239/69
See application file for complete search history.

(56) References Cited

U.S. PATENT DOCUMENTS

| | | |
|---|---|---|
| 4,189,776 A | 2/1980 | Kendall |
| 4,807,664 A | 2/1989 | Wilson et al. |
| 4,827,155 A | 5/1989 | Firebaugh |
| 4,937,746 A | 6/1990 | Brundisini |
| 5,048,755 A | 9/1991 | Dodds |
| 5,262,936 A | 11/1993 | Faris et al. |
| 5,272,620 A | 12/1993 | Mock et al. |
| 5,333,785 A | 8/1994 | Dodds et al. |
| 5,444,611 A | 8/1995 | Woytowitz et al. |
| 5,479,339 A | 12/1995 | Miller |
| 5,568,376 A | 10/1996 | Benmergui |
| 5,602,728 A | 2/1997 | Madden et al. |
| 5,748,466 A | 5/1998 | McGivern |
| 5,956,248 A | 9/1999 | Williams |
| 6,298,285 B1 * | 10/2001 | Addink et al. ............. 700/284 |
| 6,314,340 B1 * | 11/2001 | Mecham et al. ............ 700/284 |
| 6,459,959 B1 | 10/2002 | Williams |
| 6,647,319 B1 | 11/2003 | Goldberg |
| 6,694,223 B1 | 2/2004 | Goldberg |
| 6,721,630 B1 | 4/2004 | Woytowitz |
| 6,766,221 B1 * | 7/2004 | Christiansen ............. 700/284 |
| 6,772,050 B1 | 8/2004 | Williams |
| 2002/0002425 A1 * | 1/2002 | Dossey et al. ............. 700/284 |
| 2004/0086053 A1 | 5/2004 | Anderson et al. |
| 2004/0225412 A1 * | 11/2004 | Alexanian ................. 700/284 |
| 2004/0236443 A1 | 11/2004 | Ware et al. |
| 2005/0137752 A1 * | 6/2005 | Alvarez .................... 700/284 |
| 2005/0267641 A1 * | 12/2005 | Nickerson et al. ......... 700/284 |

FOREIGN PATENT DOCUMENTS

WO   WO 2004/046872   6/2004

* cited by examiner

*Primary Examiner*—Leo Picard
*Assistant Examiner*—Charles Kasenge

(57) ABSTRACT

An irrigation controller for selectively turning on and off a set of sprinkler valve stations. The irrigation controller is programmable by a user. The irrigation controller includes an irrigation control processor. The irrigation control processor includes an input port, an output port, a memory element for storing an irrigation control program and irrigation control parameters, the irrigation control program implementing a plurality of functionalities that are selectively enabled, a processing unit for executing the irrigation control program, and a bus connecting said processing unit to said memory element and to said input and output ports. An input device is interfaced with the input port. The output port is provided with interface with the sprinkler valve stations for controlling the turning on and off of the sprinkler valve stations. The input device cooperates with the control program to enable at least one specific functionality from the functionalities in response to a predetermined input being received from the user through the input device.

22 Claims, 8 Drawing Sheets

IRRIGATION CONTROLLER

This application claims priority from U.S. Provisional Patent Application Ser. No. 60/539,975 filed Jan. 30, 2004.

FIELD OF THE INVENTION

The present invention relates to the general field of irrigation. More specifically, the present invention is concerned with an irrigation controller.

BACKGROUND OF THE INVENTION

An irrigation controller is a device used to control electrically or otherwise operated valves which control the flow of water to sprinkler heads and driplines in an irrigation system. A single irrigation valve typically controls the flow of water to a specific area of a landscape. Such specific areas are commonly referred to as stations or zones.

The control of water applied to each zone allows for more efficient use of the available water supply by providing a manner whereby differential amounts of water may be applied according to the particular needs of dissimilar areas of the landscape. Also, this division of the landscape to be irrigated into a number of zones enables each zone to receive an appropriate amount of water at a pressure sufficient for the proper operation of the sprinkler heads within that zone, and is often necessary due to limitations in the capacity of the water being supplied to the system as well as the size of the piping used to efficiently carry water through the installation.

In recent years, a variety of sophisticated features have been incorporated into residential irrigation controllers. When properly utilized some of these features can contribute to an irrigation system that makes more efficient use of the available water resource. One of the challenges facing those involved in the design, manufacture and marketing of irrigation controllers is to incorporate these important features in a manner that encourages their actual use by the homeowner.

However, even with these efforts, homeowners are often intimidated by the complexity of these devices and the number of variables that make up an irrigation schedule. And beyond the homeowner, the contractors who install, repair, and in some cases maintain irrigation systems, are also confronted with the more advanced and complex array of scheduling choices provided for by some of these devices.

Therefore, while currently available irrigation controllers provide much flexibility in regards to scheduling and fine-tuning of watering activities, these sophisticated controllers also add significant complexity to the task of managing a residential irrigation system. Ease of use, be it in regards to programming an efficient watering schedule, reviewing the settings that make up an existing program, or manually initiating a watering cycle or activating a single zone, has become more important than ever in this type of device.

One manner of addressing the increasing number of parameters associated with the creation of an efficient watering schedule is to provide the user with a visual representation of the various elements which make up an irrigation Program, or Schedule. For example, several existing devices rely upon a rotary dial or switch which can be positioned to point to any one of these elements, such as pointing to a particular zone number or day of the week. However, it can be quite cumbersome to program a device (or to review an existing program) using this strategy since the mechanical dial must be repeatedly repositioned in order to address each of the particular elements which combine to create the irrigation schedule. A related problem found in controllers utilizing this strategy is that they typically have relatively small displays which at any one time provides information pertaining only to the specific parameter currently being edited or reviewed.

For example, with some of these controllers, the only way to identify the zones which have been included in a given watering Program is by rotating the dial through each zone position in order to determine if any run time has been applied to each particular zone. In the case of multi-program controllers capable of managing a number of independent watering schedules this task may be multiplied by the number of available programs.

Some devices geared to the residential user rely upon slider type switches to set the amount of run time for each zone. While this makes it relatively easy to review how long each zone will be activated, these devices often provide a fixed number of discrete selectable run times. Therefore, if a zone requires an amount of run time between two positions on the fixed scale, the user will likely select the higher value, resulting in a greater amount of water being applied than is actually needed for that particular zone. In addition, accurately setting the longer run times required for drip type applications may prove difficult (and in some cases not possible) on a device utilizing this strategy.

In some cases it may become necessary to increase the number of zones within the irrigation system. One example of this would be the need to accommodate a greater number of zones due to modifications made to the original installation. Controllers are often sold with the hardware required to operate a designated (first number) of zones, for example a four station controller may accommodate/operate up to four individual zones. If for any reason there is a need to operate more than the first number of zones for which the existing controller is capable, it may become necessary to replace it with a completely new controller having a greater zone capacity. This can be a time consuming and relatively expensive process.

Some existing controllers provide a manner of increasing the number of zones they are capable of operating by purchasing and installing what are generally referred to as expansion modules. However, controllers using this expansion method must provide additional space within the housing to accommodate these modules than would otherwise be necessary. This leads to products which must be designed to be large enough to accommodate the full number of modules for which they are capable of receiving, regardless of the actual number of modules being utilized in any given installation. Further, improper installation of a module may cause it to become damaged, prevent it from operating properly, or lead to other electrical problems.

Yet another problem with existing irrigation controllers is that they typically are factory set with a designated group of features that may not be modified. For example, a 2 Program capable controller cannot later be upgraded to accommodate 3 Programs. In a closely related situation, the designated set of features cannot be modified regardless of whether or not they are required for a particular installation.

For example, presenting the user with 4 possible start times when no more than 2 will be utilized, or providing advanced features that are not required to meet the scheduling requirements of the particular installation, add undue complexity to the programming process. This increased complexity is often confusing to owners of irrigation systems. Also, the user/homeowner can end up paying for features that he or she doesn't need.

In a related problem, some features of an irrigation schedule are better left to be set by a contractor. If the contractor sets parameters related to these features, and if subsequently an end user resets some of these parameters, the irrigation schedule will typically become inadequate. Often, the contractor will need to reset these parameters to their appropriate values.

Large numbers of irrigation controllers are sold through retail channels such as large hardware box type stores. Generally there is no opportunity for the consumer to evaluate one of these products prior to purchasing it and the consumer is then left with a difficult choice to make in buying an untested product.

Against this background, there exists a need in the industry to provide a novel irrigation controller.

OBJECTS OF THE INVENTION

An object of the present invention is therefore to provide an improved irrigation controller.

SUMMARY OF THE INVENTION

In a first broad aspect, the invention provides an irrigation controller for selectively turning on and off a set of sprinkler valve stations. The irrigation controller is programmable by a user. The irrigation controller includes an irrigation control processor. The irrigation control processor includes an input port, an output port, a memory element for storing an irrigation control program and irrigation control parameters, the irrigation control program implementing a plurality of functionalities that are selectively enabled, a processing unit for executing the irrigation control program, and a bus connecting said processing unit to said memory element and to said input and output ports. An input device is interfaced with the input port. The output port is provided to interface with the sprinkler valve stations so as to control the turning on and off of the sprinkler valve stations. The input device cooperates with the control program to enable at least one specific functionality from the functionalities in response to a predetermined input being received from the user through the input device.

In specific examples of implementation, the input device includes a keypad, a network interface, a microphone, an image input device, such as a bar-code readers and other, or any other suitable input device.

In a specific example of implementation, the specific functionality enabled includes controlling a number of sprinkler valve stations that is larger than a number of sprinkler valve stations controlled prior to the reception of the predetermined input. However, many other specific functionalities are within the scope of the claimed invention.

The predetermined input is to be contrasted with any input that might be entered by the user during the entry of irrigation control parameters. In contrast, the predetermined input allows to enable a functionality and not simply to allow a previously enabled functionality to become effective, for example by entering a start time indicative of a time at which irrigation is to start in a specific zone.

Advantageously, the controller allows an expansion that does not require having to replace an existing controller by another controller. Also, at least some of the electronic and electrical components present in irrigation controllers are typically relatively inexpensive. Therefore, the claimed controller allows, in some embodiments of the invention, to have an expandable controller that includes all the electronic and electrical components required to implement all the disabled functionality. Then, when a user wishes to enable the specific functionality, he only has to provide the predetermined input without requiring that additional electrical or electronic components be added to the controller. Furthermore, the controller allows to enable only temporarily some functionalities.

In a second broad aspect, the invention provides a method for enabling a specific functionality in an irrigation controller.

In a third broad aspect, the invention provides a computer readable storage medium containing a program element for enabling a specific functionality in an irrigation controller.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
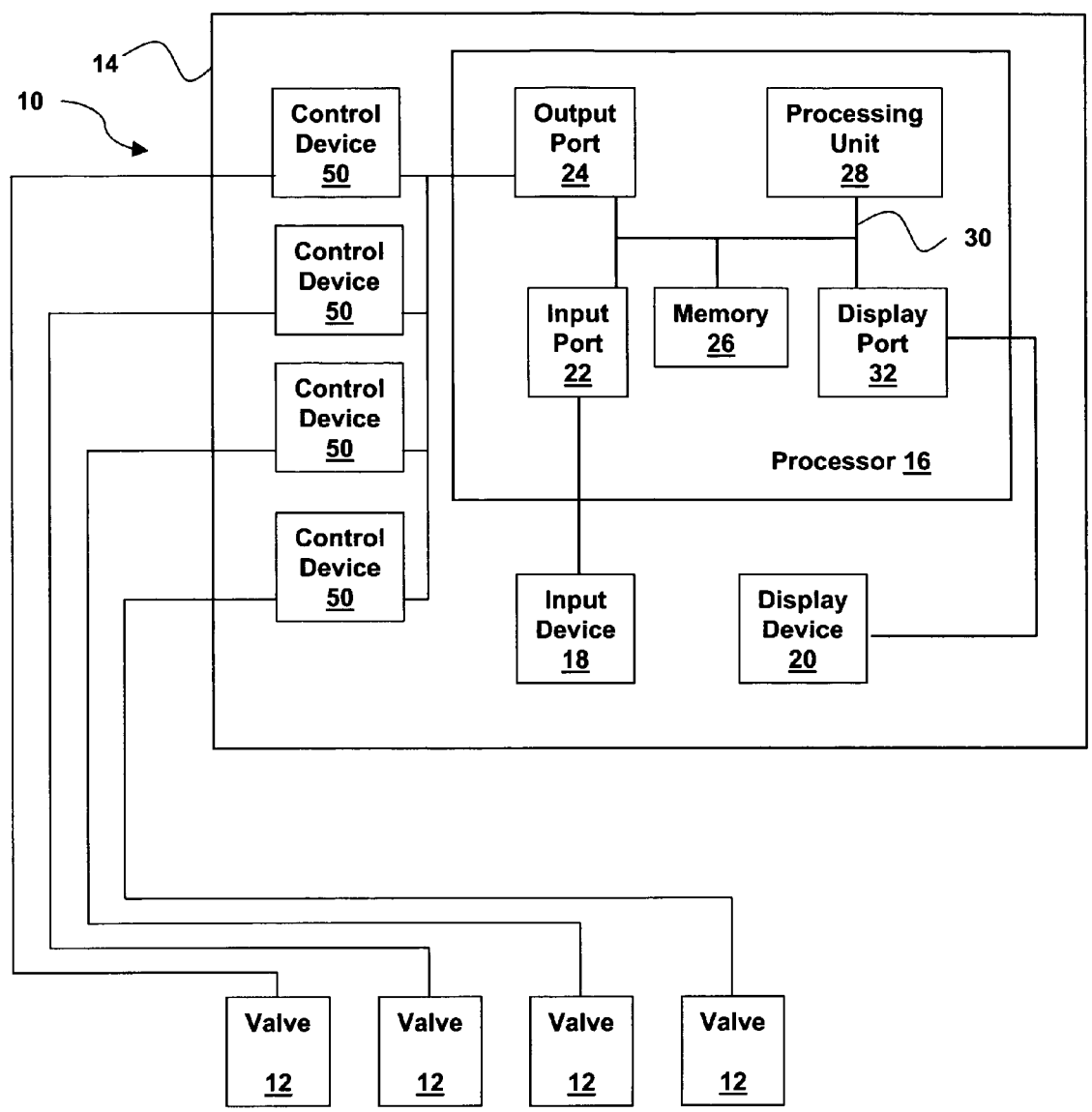
FIG. 1 illustrates in block diagram form an irrigation controller connected to a set of sprinkler valve stations 12.

FIG. 1 illustrates in block diagram form an irrigation controller 10 programmable by a user for selectively turning on and off a set of sprinkler valve stations 12. The irrigation controller 10 shown in the drawings is connected to four sprinkler valve stations. However, it is within the scope of the invention to have irrigation controllers connected to any suitable number of sprinkler valve stations 12, including a single valve station 12, among other possibilities.

Figure 2:
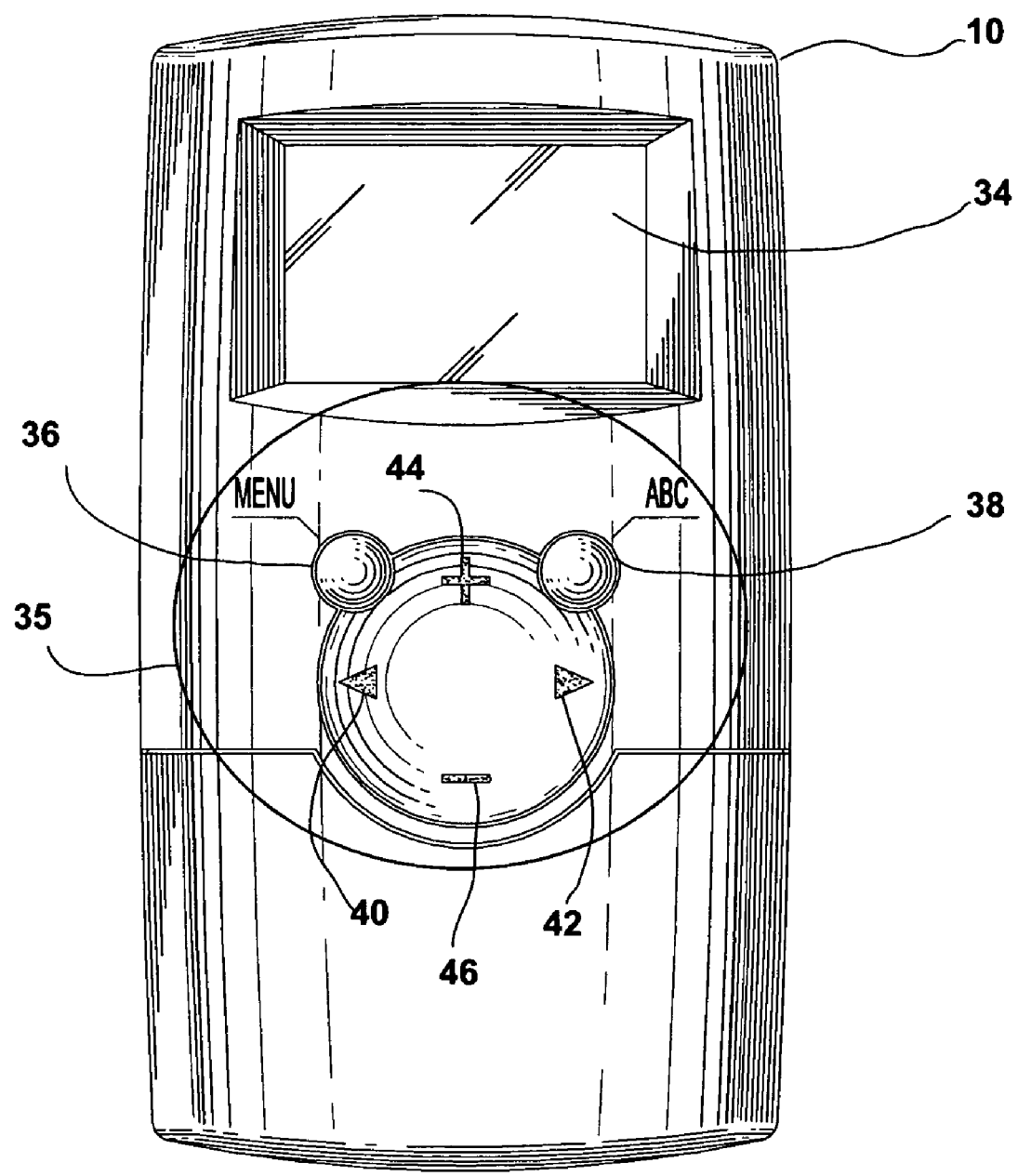
FIG. 2 is a front elevation view of the irrigation controller of FIG. 1.

In a specific embodiment of the invention, shown in FIG. 2, the irrigation controller 10 includes a controller housing 14. An irrigation control processor 16 and an input device 18 are mounted in the housing 14. In some embodiments of the invention, the irrigation controller 10 further includes a display device 20 mounted in the housing 14. However, in alternative embodiments of the invention, one or more of the processor 16, input device 18 and display device 20 are provided outside of the housing 14.

The control processor 16 includes an input port 22, the input device 18 being interfaced with the input port 22. The control processor 16 further includes an output port 24 for interfacing to the sprinkler valve stations 12 and controlling the turning on and off of the sprinkler valve stations 12. A memory element 26 stores an irrigation control program and irrigation control parameters, the irrigation control program implementing a plurality of functionalities that are selectively enabled. The control processor 16 also includes a processing unit 28 for executing the irrigation control program. A bus 30 connects the processing unit 28 to the memory element 26 and to the input and output ports 22 and 24.

In irrigation controllers 10 including a display device, the irrigation controller 10 further includes a display port 32, the display device being interfaced with the display port 32. Then, the bus 30 further connects the processing unit to the display port 32.

The input device 18 cooperates with the control program to enable at least one specific functionality from the functionalities in response to a predetermined input being received from the user through the input device 18.

FIG. 2 illustrates a non-limitative example of an irrigation controller 10 according to the invention. FIG. 2 shows the housing 14, which may be manufactured using a polymer, for example. The housing 14 receives a display device in the form of a liquid crystal display (LCD) 34 and an input device in the form of a keypad 35 including keypad buttons 36, 38, 40, 42, 44 and 46 used for programming and operating the irrigation controller 10. These components are integrated within an electronic circuit board (not shown in FIG. 2) contained within the housing 14. The circuit board interlinks and supports the various electronic and electrical components required for the operation of the invention, including non-limitatively the control processor 16.

Within the housing 14, there is provided an output device 20 in the form of a terminal block (not shown in the drawings) with connection points for connecting the invention to a variety of external devices. Examples of suitable external devices include a sprinkler control valves 12, a pump start relay, a device for detecting rain, soil moisture or climatic data, and an external power supply (if required) such as an ac source (or alternate source of power such as a battery or solar power), among others.

Such housings and terminal blocks are well-known in the art and are therefore not described in great detail hereinbelow.

Figure 3A:
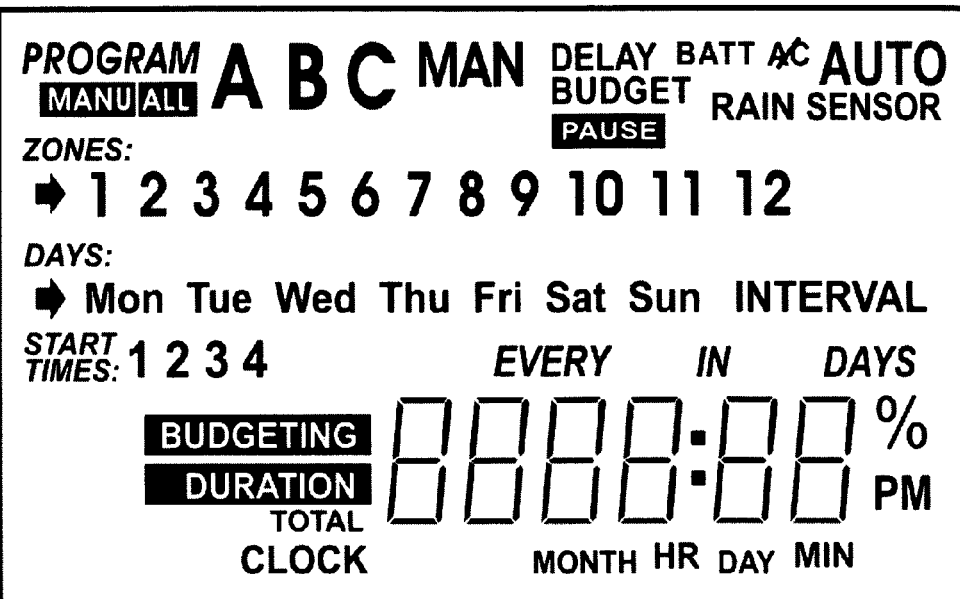
FIG. 3a is a schematic view of a Liquid Crystal Display of the irrigation controller of FIG. 1.

The keypad 35 allows the user to program the controller 10, review the programmed information and to manually operate the sprinkler control valves 12. The LCD display 34 provides information to the user during programming or while reviewing previously programmed information, to indicate to the user items which require attention (such as when the battery is in need of replacement, for example) and to provide information related to any currently performed watering activities. FIG. 3a illustrates a specific example of the organization of text and symbols within the LCD 34.

Figure 3B:
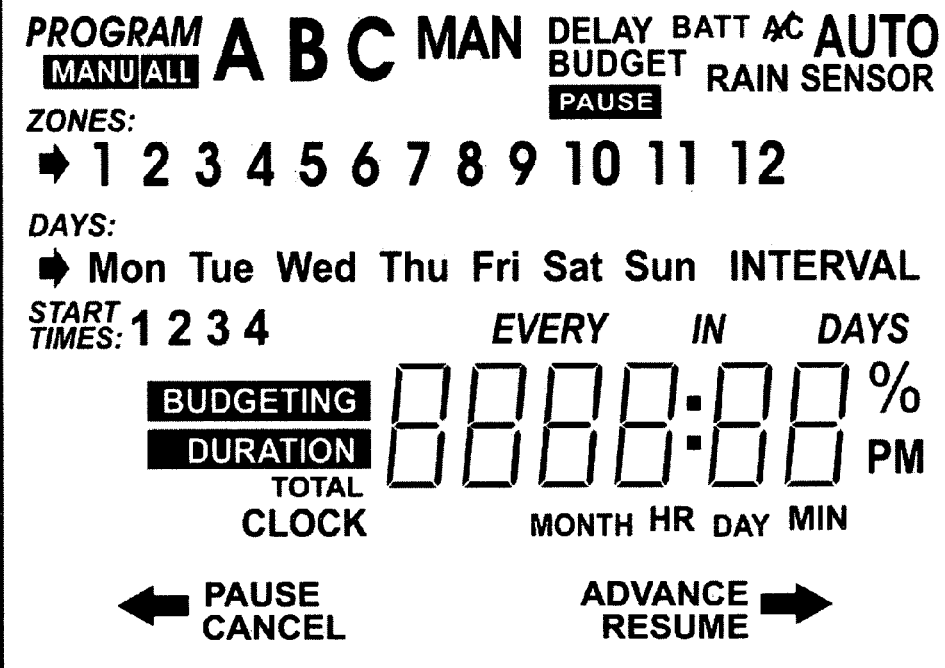
FIG. 3b is a schematic view of an alternative embodiment of a Liquid Crystal Display.
Figure 3C:
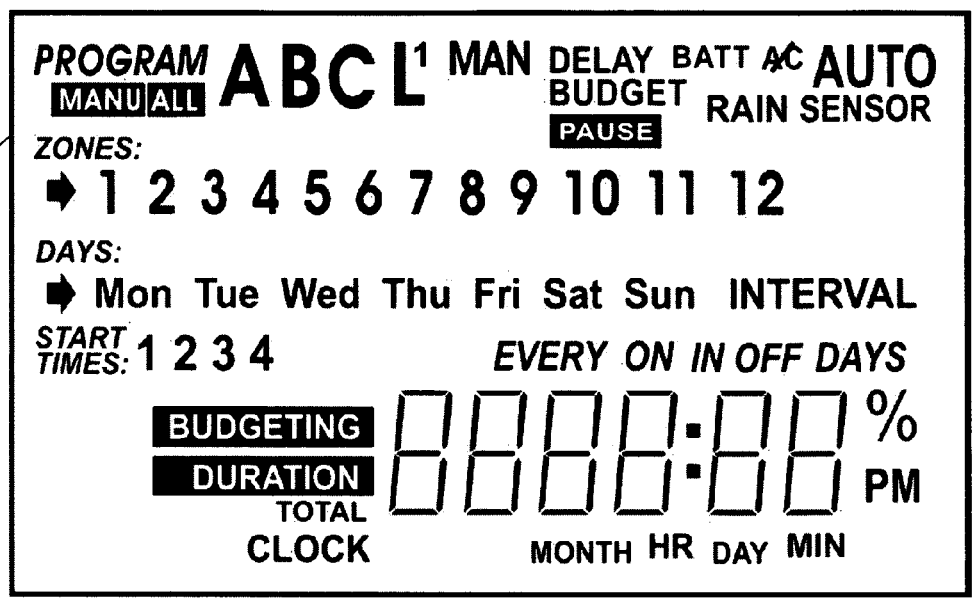
FIG. 3c is a schematic view of another alternative embodiment of a Liquid Crystal Display.

The reader skilled in the art will readily appreciate that the LCD 34 illustrated in the drawings is only an example of a LCD 34 usable in conjunction with the invention. Many other LCDs are also suitable for use in conjunction with the invention, including non-limitatively LCDs 34' and 34" illustrated in FIGS. 3a and 3b. In addition, it is also within the scope of the invention to have alternative display devices 20, such as for example display devices including Light Emitting Diodes (LED), Cathode Ray Tubes (CRT) and any other suitable display devices 20.

In an example of implementation, the specific functionality that is enabled by the predetermined input includes controlling an extended subset of sprinkler valve stations 12 from the sprinkler valve stations 12. Prior to the predetermined input being received from the user through the input device 18, the control program controls a basic subset of sprinkler valve stations 12 disjoint from the extended subset of sprinkler valve stations 12. For example, prior to the predetermined input being received from the user through the input device 18, the control program controls the two leftmost sprinkler valve stations 12 shown on FIG. 1. In this case, the two rightmost sprinkler valve stations 12 shown on FIG. 1 are not controllable by the control program and might be absent from an irrigation system.

When the user wishes to add additional sprinkler valve stations 12, the user connects the extended subset of sprinkler valve stations 12 to the irrigation controller 10. Then, the user provides the predetermined input. Thereafter, the control program controls both the base and extended subsets of sprinkler valve stations 12.

In an example of implementation, the output port 24 is connected to control devices 50 included in the irrigation controller 10. Each control device 50 controls the turning on and off of a respective one of the sprinkler valve stations 12. An example of such a control device 50 is a triac. When the user acquires the irrigation controller 10, only some of the control devices 50 are enabled. Then, when the user wishes to enable more control devices 50, the user provides the predetermined input.

In a specific embodiment of the invention, the predetermined input is sold to the user. Then, the user may add sprinkler control stations 12 without requiring the addition of any hardware to the controller 12. In another embodiment of the invention, the predetermined input is readily available to the user who simply provides this predetermined input upon requiring the use of a number of control devices 50 larger than the number of control devices enabled when the user acquires the controller 10.

In another example of implementation, the specific functionality is any other specific functionality, such as for example:

a water management functionality whereby a base time sequence of activation of sprinkler valve stations 12 is globally altered through a global parameter;

a lighting functionality whereby the activation and inactivation of a light is performed using the irrigation controller 10;

a rain sensing functionality whereby an adjustment of activation times for each sprinkler valve station 12 is performed in response to a control signal received from a rain sensor;

an alternate sensing functionality whereby an adjustment of activation times for each sprinkler valve station 12 is performed in response to a control signal received from an evapotranspiration (ET) sensor;

an additional start time functionality whereby on or more start times for the beginning of an irrigation in a zone are provided;

a rain delay functionality;

a master pump control functionality whereby the activation and inactivation of a master pump providing water to the sprinkler valve stations 12 is controllable; and any other suitable functionality.

More details are provided on some of these functionalities hereinbelow.

In a specific embodiment of the invention, the specific functionality is enabled by a predetermined input that is bought by the user. Then, the predetermined input allows to add a functionality to the irrigation controller 10 without requiring the acquisition of a new controller.

In another embodiment of the invention, the specific functionality enabled by a predetermined input that is provided to the user when the irrigation controller 10 is bought. Then, the enablement of only specific functionalities allows the user to customize the irrigation controller 10 such that only the functionalities that the user wishes to use are enabled. This reduces the complexity of the programming process as the user only needs to take into account the functionalities that are enabled. Also, only parameters relating to these enabled functionalities are requested by the irrigation controller 10 during the programming process.

In yet another embodiment of the invention, the specific functionality is a limited access functionality that should be enabled only when an authorized user uses the irrigation controller 10. An example of such an authorized user is a contractor. Another example of such an authorized user is an authorized service technician servicing the irrigation controller 10.

A specific and non-limiting example of a limited access functionality is the activation and the inactivation of a master control valve. A specific and non-limiting example of a limited access functionality is a functionality allowing the Manual Operation of individual valve stations.

In the case wherein the specific functionality is a limited access functionality, the input device 18 cooperates with the control program to disable the specific functionality in response to a second predetermined input being received from the user through the input device 18. Alternatively, the specific functionality is automatically disabled after a predetermined time interval further to the enablement of the specific functionality.

The reader skilled in the art will readily appreciate that the disablement of a specific functionality in response to a second predetermined input being received from the user through the input device 18 and an automatic disablement of a specific functionality after a predetermined time interval further to the enablement of the specific functionality may both be performed in alternative embodiments of the invention for any enabled specific functionality. For example, it is convenient in some of these embodiments to be able to perform a "reset" function wherein previously enabled functionalities are able to be disabled if the user wishes to return to a previous state of the controller.

A specific example of an input device 18 is the keypad 35. Then, a suitable predetermined input includes a predetermined key sequence entered with the keypad 35. Also, a suitable predetermined input including a predetermined key sequence is usable, among other possibilities, when an alternative keypad, such as for example a numeric or an alphanumeric keypad is provided within the input device 18.

In the case wherein a keypad similar to the keypad 35 is provided, an alternative suitable predetermined input includes the entry of a predetermined sequence of symbols through the keypad 35, the keypad 35 allowing the selection of the symbols from a predetermined set of symbols by displaying in sequence the set of symbols onto the display device 20 in response to a first predetermined key from the keypad 35 being pressed by the user and by selecting a symbol as being entered in response to a second predetermined key from the keypad being pressed by the user. Such a manner of entering symbols through keypads including a limited number of keys are well-known in the art and will therefore not be described in further details. In some embodiments of the invention, the keypad 35 allows the selection of the symbols from a predetermined set of symbols by displaying in reverse sequence the set of symbols onto the display device 20 in response to a third predetermined key from the keypad 35 being pressed by the user.

The predetermined input is at least in part determined by a predetermined identifier associated with the irrigation controller 10. In a specific embodiment of the invention, the predetermined input depends in part upon the functionality to enable and in part on the predetermined identifier. The predetermined identifier is for example the serial number of the irrigation controller 10 or any other suitable identifier.

Accordingly, in this example, the predetermined identifier may enable only a functionality in selected irrigation controllers. If required, the predetermined identifier and the predetermined input are selected so that the predetermined input may enable at least one functionality only in one specific irrigation controller 10. In this case, in some embodiments of the invention the predetermined identifier is encrypted within predetermined input so as not to allow a user to use the predetermined input with another irrigation controller. However, it is within the scope of the invention to have any other suitable relationship between the predetermined identifier and the predetermined in put.

Predetermined identifiers and predetermined inputs and manners of associating predetermined identifiers with predetermined input are well known in the art and will therefore not be described in further detail.

Figure 4:
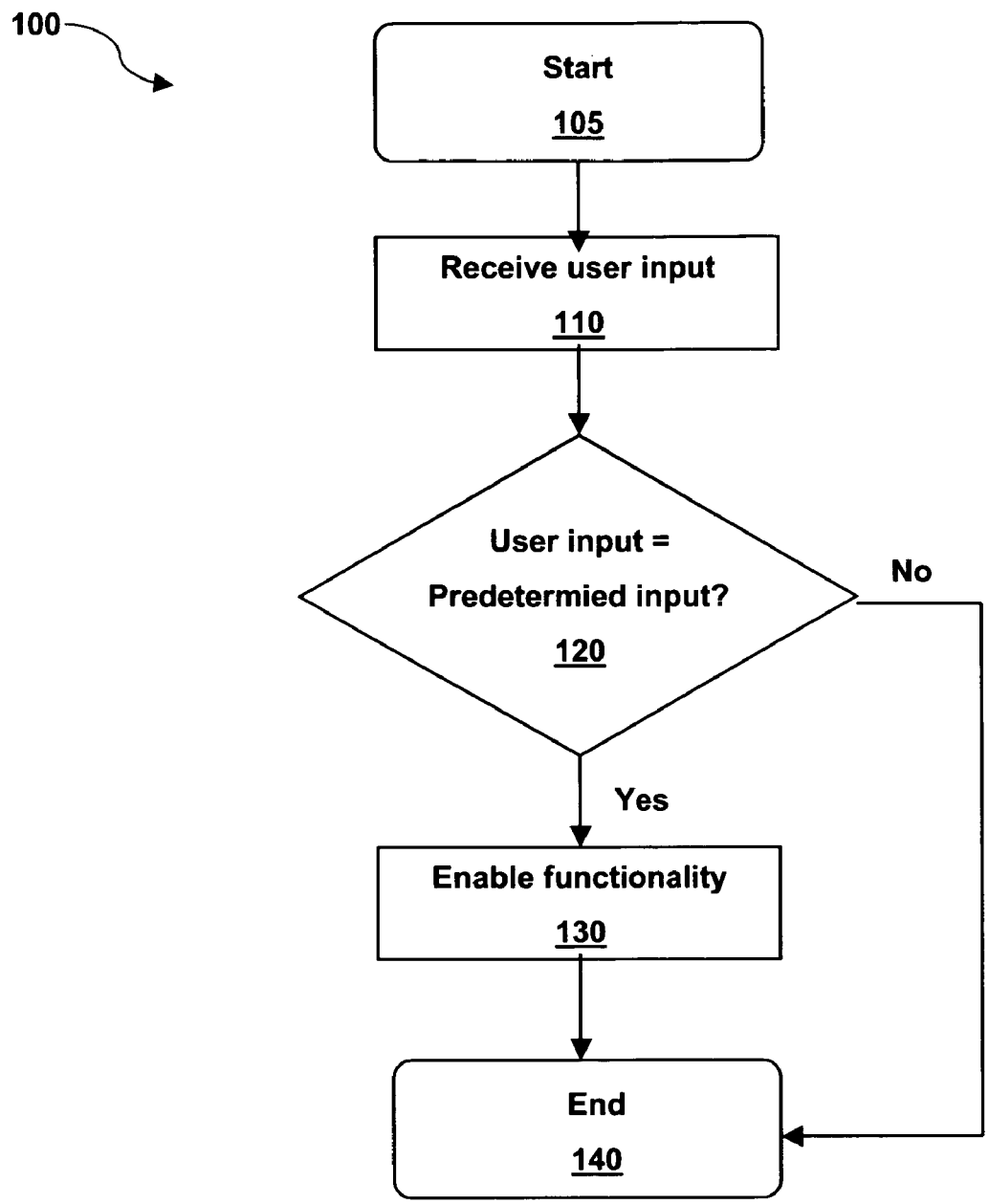
FIG. 4 is a flowchart illustrating a method for selectively enabling a specific functionality from a plurality of functionalities in the irrigation controller of FIG. 1.

In other words, the irrigation controller 10 implements a method 100, illustrated in flowchart form in FIG. 4, for selectively enabling a specific functionality from a plurality of functionalities in an irrigation controller. The method 100 starts at step 105. At step 110, a user input is received by the input device 18. Then, at step 120, the processing unit 28 compares the user input to a predetermined input stored in the memory unit 26. Upon the user input being identical to the predetermined input, the specific functionality is enabled at step 130 and the method ends at step 140. For example, and non-limitatively, a flag is set within the memory unit 26, the flag indicating that the specific functionality is enabled. If the user input is not identical to the predetermined input, the specific functionality is not enabled at step 130 and the method directly ends at step 140.

Figure 5:
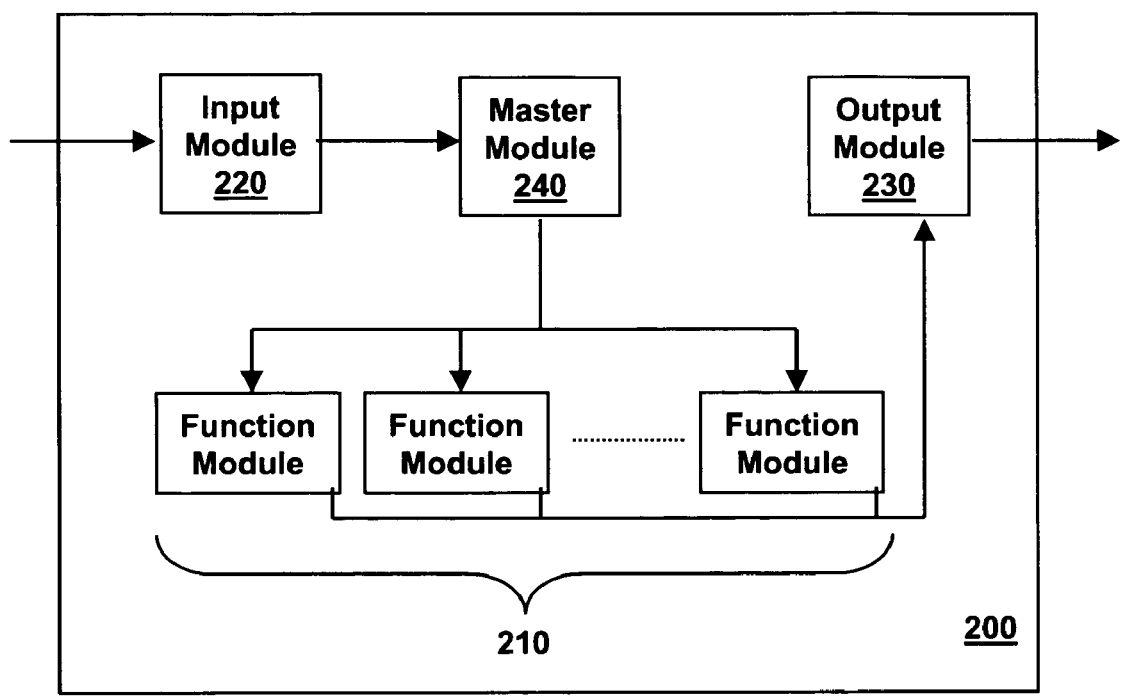
FIG. 5 is a block diagram of a program element for execution by the irrigation controller of FIG. 1, the program element selectively turning on and off a set of sprinkler valve stations connected to the controller of FIG. 1.

The method 100 is implementable in any suitable irrigation controller. As shown in FIG. 5, in some embodiments of the invention, a computer readable storage medium contains a program element 200 for execution by an irrigation controller taking the form of a computing device, the program element selectively turning on and off a set of sprinkler valve stations 12.

The program element 200 includes a plurality of function modules, collectively referred-to by the reference numeral 210, each implementing a respective functionality that is selectively enabled. Although only three function modules 210 are illustrated in the program element 200, it is within the scope of the invention to have any suitable number of function modules 210.

The program element 200 further includes an input module 220 for receiving inputs from the input device 18 through the input port 22. In addition, an output module 230 interfaces to the sprinkler valve stations 12 for controlling the turning on and off of the sprinkler valve stations 12 through the control devices 50.

A master module 240 enables and disables the functionalities implemented by the function modules 210. The master module is operative for enabling at least one specific functionality from the functionalities in response to a predetermined input being received by the input module 220.

Additional details regarding the irrigation controller 10 are given hereinbelow. The reader skilled in the art will readily appreciate that alternative controllers that are still within the scope of the invention include these details only partially. Also, it is also within the scope of the invention to have an irrigation controller that have other features than the ones mentioned hereinbelow.

Generally, a set of activation times and activation durations for the sprinkler valve stations 12 are designated by the term "irrigation schedule". Typically, there are three basic elements included in a typical irrigation schedule: 1) the amount of watering time allocated to each zone, which generally refers to the amount of time a sprinkler valve station 12 which feeds water to a given area of the landscape will remain turned on, 2) the days of the week when watering is to occur, or, alternatively, an interval type of schedule whereby watering will occur either every n days, n being an integer larger than 0, or on even or odd calendar days, and 3) one or more start times determining the time(s) of day that a watering cycle is to begin. In addition, the irrigation controller 10 provides for additional features such as the ability to postpone watering for a certain number of days (typically referred to as implementing a rain delay) as well as a budgeting feature which allows the programmed watering duration times across all zones within a given program cycle to be increased, or reduced, according to a user specified percent factor of their programmed run times.

Generally, when a scheduled watering cycle is initiated in accordance with a programmed schedule, at a specific time and on an 'active' watering day for which watering has been scheduled to occur, the irrigation controller 10 will actuate the first zone included in the given program having a specified run time of one or more minutes. Where a master valve or a pump start relay has been installed it will be activated along with the activation of any given zone. When this amount of time has expired, the cycle will advance to the next zone in the series with a programmed duration of one or more minutes (up to several hours in the case of drip irrigation, a method of irrigation wherein water is applied at a very low rate). This method for the sequential operation of all zones within the given cycle will continue until the last zone in the series having a programmed time of one or more minutes has run for its full programmed duration.

When the irrigation controller is initially installed, or if the watering schedule information programmed into the memory 26 of the controller 10 has been lost for any reason (for example if the unit has been without ac power for an extended period of time) the controller 14 will revert to a default program which will provide a limited amount of watering for each zone at a fixed start time, say 6:00 am, for example. This is to ensure that a minimal amount of watering will occur in the event that the programmed water schedule data has been lost for any reason. However, for normal operation, a defined series of steps must be followed in order to provide the controller 10 with the appropriate data which will define the actual irrigation schedule.

Programming of Irrigation Schedules

There are a number of programming modes which are accessed in sequence by means of a mode button 36. The modes are ordered in such a manner that one or more complete irrigation schedules will result as the user moves from one mode to another providing data appropriate to each mode. With each press of the mode button 36, the controller 10 enters into its next programming mode wherein the current program data can be reviewed or modified. Initially, the controller 10 is in the Ready Mode with the current weekday and time of day shown in the display device 20 (along with other system related information).

In the irrigation controller 10, the input and display devices 18 and 20 cooperate with the control program to sequentially prompt the user to enter a value for each of the irrigation control parameters, thereby defining a sequence of irrigation control parameters, each irrigation control parameter being prompted for in response to the user indicating that a preceding control parameter in the sequence of control parameters is correctly entered.

In a specific example of implementation, the user is prompted for a given control parameter only if the control parameter is associated with a functionality implemented by one of the function modules 210 that is either provided by default with the controller or that has been previously enabled by the master module 240.

Setting up, or programming, an irrigation schedule is accomplished via the keypad buttons 36, 38, 40, 42, 44 and 46 using the following method.

Ready Mode: This is the default mode for the controller. The present time is displayed in the LCD 34 along with the current day of the week. Additional segments in the LCD 34 provide information to the user with regards to the status of the controller such whether the backup battery needs to be replaced or the state of a rain sensor device connected to the controller. Within the Ready mode, with the current time of day showing in the display, pressing the minus button 46 will effectively set the controller to off. This will be indicated in the display in a suitable manner such as with 'off' in place of the current time of day. In this state the automatic initiation of any scheduled irrigation activities will be inhibited. Pressing the plus button 44 will restore the controller to automatic status and permit watering according to the programmed schedule.

If a rain sensor is connected to the controller 10, and, if at the instant that an irrigation cycle is schedule to automatically be initiated, a predetermined amount of recent precipitation has already been recorded then the current cycle will be inhibited. It is possible to set the controller 10 to ignore the status of the sensor. If the controller 10 is already set for automatic operation, and the plus button 44 is pressed again, the controller 10 will remain in the automatic position, however no consideration will be given to the state of the sensor. The fact the sensor is has been bypassed will be indicated on the display device 20.

When the controller 10 is set to 'Off', pressing the minus button 46 again will institute a global delay of one day (see the description under the heading Delay Mode below for more information on setting a global delay period which applies to all programmed watering activities). From this point each press of the minus button 46 will increase the number of consecutive days for which watering will be suspended up to a maximum of 30 days. Pressing the plus button 44 will likewise reduce the number of delay days until the controller 10 is again set to off. Pressing the plus button 44 again from this point will restore the device to the automatic position. As an alternate means to override a rain sensor device directly connected to the controller a dedicated switch for this purpose could be located behind the front access panel.

Clock Mode: In Clock mode the user can set or review information regarding the present date and current time of day. Date related information is maintained in order to provide for interval type scheduling where watering is to be scheduled for even or odd calendar days. It is contemplated that such date information could further be used to automatically adjust station run times on a seasonal or monthly basis. Upon entering this mode the time will be displayed with the hour digits flashing indicating to the user that it is the currently selected item which can now be adjusted using the plus or minus buttons 44 or 46. In general, when an item is flashing during any programming activity, it is the value of the flashing item which will be affected when the plus or minus button 44 or 46 is pressed. Generally, when either of these two buttons 44 or 46 is held down for a brief duration, the scrolling rate will increase, that is, the value shown in the display will change more rapidly. When the correct time of day has been reached, the user can advance to the minutes portion of the time value by pressing the right arrow button 42. Once the correct minute value has been set, the user again presses the right arrow button 42 to advance the next item which in this case is the 4 digit value of the current year. Once the correct year has been set, the user presses the right arrow button 42 to advance to the next item which is the current month value shown either in the form of a numeral from 1 to 12 or using appropriate text in abbreviated format. While setting this value, the actual name of the day (abbreviated as Mon or Tue etc.) corresponding to the year, month, and day of the month entered by the user will appear in the display. Upon pressing the right arrow button 42, the controller 10 will return to the Ready mode and the current time of day along with the abbreviated day of the week name will show in the display. At any time the user may press the mode button 36 to advance out of this mode and into the next mode. The current date information provided by the user is saved to the memory unit 26.

Set Delay Mode: In this mode a watering delay, often referred to as a rain delay, from 1 to a maximum of 30 days can be applied to one or more schedules. This feature is used to prevent watering for a specific number of days, typically when there has been significant rainfall and irrigating will not be required for one or more days. When the delay period expires, the controller 10 will resume normal automatic watering activities.

In a specific embodiment of the controller 10, 3 independent schedules are provided. They are generally referred to as to as Programs A, B and C, but any other suitable designation may be used. A global delay setting of two days will prevent all watering activities, across all programs, for two days. Alternately, a delay can be applied to a specific program, say Program A, to prevent the automatic operation of the program A cycle for a specified number of delay days, without affecting the operation of programs B and C. However, if a global delay setting is already in effect, then no delay can be set on a 'local', or program specific level. Similarly, if one or more program specific delays are in effect, the user will be locked out from setting a global delay (dashes will display where normally the delay period number of days is shown). Of course, if the user were to set a delay of say three days for each program, this would accomplish the same thing as setting a global delay of three days. The global delay provides a simpler and more direct way of accomplishing this. If a global delay is desired, and one or more program specific delays has already been instituted, the user would first have to reduce the number of delay days to zero for each affected program prior to being able to set a global delay. The reverse is also true in that in order to set a delay for a specific program, there must be no global delay in effect.

Upon entering this mode the global delay setting is displayed. If no global delay is in effect, then 'off' or '0' (zero) delay days will be indicated in the LCD 34. The word "ALL" is shown in the LCD 34 along with the letters identifying all of the available programs, in this case, A B and C. The plus and minus buttons 44 and 46 can be used to increase or decrease the currently set value, that is, the number of days for which all watering activities will be delayed ranging from 0 to a maximum delay of 30 days. The "ABC" (or "Program") button 38 is used to select amongst the available programs. With each press of this button 38 the device will advance to the next program and the display will be refreshed to show the relevant delay setting for the newly selected program. When viewing the delay information of the last available program, say program "C" in the case of a device, which provides for three programs, pressing the program button 38 again will reselect the global delay selection. At any time the user may press the mode button 36 to exit the Delay setting mode and the controller 10 will advance into the following mode, saving any changes into its memory.

Set Budget Mode: In the Set Budget mode, a water budgeting percent value ranging from 0 to 200% can be applied. Budgeting is a allows the user to increase or decrease the actual zone run times by a percent factor. In a manner similar to that described above with regards to setting a rain delay value, budget values can be set either globally across all Programs, or a value can be applied to one or more programs specifically.

As with the programming of a watering delay period described above, budgeting may be applied on either a local or a global level. At the 100% setting all zones will operate according to their actual programmed run time values. At the 50% any affected zone will have its run time reduced to half its programmed value. A global budgeting value of 0% effectively reduces all watering run times to 0 minutes, effectively inhibiting all automatic watering.

Run Time Mode: In Run Time mode the user can apply an amount of run time to each zone where watering is desired. Zone run times range from 1 minute to several hours for drip type irrigation. Each zone is selected in turn and its desired amount of run time applied. When, from the preceding mode, the user presses the mode button 36 to enter into the Set Run Time mode, and while the button 36 is being pressed and so long as remains held down, all of the zone numbers are displayed in the LCD 34 across a single row. For example, for a 12 zone enabled controller all 12 indicia are displayed in the LCD 34.

When the mode button 36 is released, the indicia of all available zones will continue to be displayed for a brief period. Following this brief delay, only the indicia representing zones with a programmed run time of one or more minutes will continue to display. The first zone number with a run time of one minute or more now flashes on the LCD 34, indicating that it is the currently selected item, for example, zone 1 if it has a run time applied to it (and if it has not been set to 'off'). The applied run time will flash in conjunction with the numeral '1' segment to indicating to the use that the displayed run time value belongs to this zone. The user can edit this run time value using the plus or minus buttons 44 or 46 to respectively increase or decrease the applied run time for this zone. The right arrow button 42 is pressed to advance to the next active zone in the series. Upon doing so, zone 1 will continue to display only if it has a run time of one minute or more, that is, only if it has been included in the current Program. The newly selected zone number along with its run time value will be displayed in a flashing manner. The user can now edit this time value via the plus or minus buttons as described above. This process continues until the user has completed setting all run times for all the zones which are to be included in the currently selected program. In addition to using the right arrow button to 42 advance to the next zone, the user can use the left arrow button 40 to move to a lower numbered zone, that is, to move leftwards in the row of zone numbers appearing in the display. If the user is at the highest number zone, pressing the right arrow will reselect (wrap around to) zone number 1. Similarly, if the left arrow is pressed when zone 1 is currently selected, the highest number zone will be selected. An alternative would be to allow for the arrow at the leftmost of this row to be selected, at which time it could be displayed in a flashing manner along with the total run time for the current program (that is, the sum of all the run times of the active zones in the current Program).

When any given zone is selected and its run time is displayed, pressing the plus and minus buttons 44 and 46 simultaneously will set the selected zone to 'Off'. This does not imply that its run time will be set to zero minutes as the currently set run time will remain in the memory 26. However, the zone will not be activated during the watering cycle. This enables the user to exclude (inactivate) a zone from the cycle (should there be a leak in the zone for example) without losing the appropriate time value already programmed for that zone. If the plus and minus buttons 44 and 46 are again pressed simultaneously, the time value stored in the memory 26 will reappear in the time portion of the LCD 34 and the zone will again be made active. In the case where the applied time for a zone is in fact set to zero minutes, this could either be indicated as zero minutes or as 'Off.' In this case pressing the plus and minus buttons 44 and 46 simultaneously will effectively apply a run time of one minute to this particular zone. At any time, the user can advance to the next mode by pressing the mode button and any changes to the run time values will be saved to memory 26.

Active Day mode: The next mode is the Active Day mode. In this mode the active watering days (days on which watering will occur) are selected. The controller 10 can be programmed to water either according to a weekday schedule wherein specific days are selected, or according to an interval type schedule wherein watering may be scheduled to occur from every day to every 30 days, or, alternately, on even or odd calendar days of the month. An odd/even calendar day type of interval scheduling provides for compliance with restricted watering schedules which may be in effect in a given area.

When Set Active Day mode is entered, a row of weekday names in abbreviated form appears in the LCD 34. As in the display of available zone numbers described above in regards to programming of run times, when the mode button 36 is pressed from within the previous mode, and while the button is held down, all days of the week are displayed along with the text 'INT' (representing the interval option) across a single row. When the button is released, the display of all available days and 'INT' is maintained for a brief delay. Following this brief delay only active (on which watering is to occur) days continue to display, or, in the case where an interval setting is in effect, only the "INT" text along with the specific interval setting. Note that even with an interval type of schedule in effect, it would also be possible to allow the user to select (specify) the days of the week upon which watering may occur, thus preventing watering from taking place on the non-selected days irregardless of the interval setting.

Weekday Scheduling: The first active day in the series of weekday names flashes. Pressing the plus button 44 will make the selected day an active watering day and 'on' or 'yes' will appear in the display, while pressing the minus button 46 will prevent watering on that day and 'off' or "no" will display. The right and left arrow buttons 40 and 42 are used to select the next (or previous) day of the week. When the user reaches 'INT' in the day display row, 'Off' will display indicating that no interval setting is in effect Interval Scheduling: When the user reaches 'INT' in the day display row an interval type of schedule can be set in place of a weekday schedule. The specific interval is set or modified using the plus and minus buttons 44 and 46. An interval can be set for every n'th day watering from 1 to 30 days, or alternatively watering can be restricted to even or odd calender days. There is also an 'off' position which will appear as one scrolls through the possible settings. Specifically, from the 'off' setting, pressing the plus button 44 repeatedly will advance the interval setting from 'off' to every "Even" day, to every "Odd" day and then from every 1 to 30 days and then back to 'off'. Similarly, the minus button 46 can be used to scroll through the available settings in the reverse direction. Note that in a similar fashion as described above in the Run Time mode, pressing the plus and minus buttons 44 and 46 simultaneously will disable interval watering and 'off' will be indicated in the display. In this case the last indicated interval setting will remain in memory and simultaneously pressing plus and minus buttons 44 and 46 again will restore this last value. Once the desired interval period has been set, the user can select when the interval is to begin in terms of how many days from the present day. This value appears to the right of the interval period setting. The right arrow button 42 is pressed to advance to this value which will then flash. The 'in how many days' value be set from 0 to 30 days via the plus and minus buttons 44 and 46. For example, if the interval has been set to every 2nd day, and the in how many days value is set to 3, watering will be every 2 days, starting 3 days from now. A zero value indicates that watering will occur on the present day. When an interval setting is in effect, 'INT' selected upon entering into Active Day mode. To cancel an interval type program and change to a weekday program, the interval setting must first be re-set to 'off', at which point the user can once again advance across the weekday row using the right and left arrow buttons in order to select and then enable or disable each day of the week. Note that even with an interval setting in effect, it would still be possible to allow the user to select and disable specific days of the week, thereby preventing watering from taking place on the specified days regardless of the interval setting. At any time the user may press the mode button 36 to advance to the next mode. Any changes to the watering schedule will be saved to memory 26.

Start Time Mode: When the mode button 36 is pressed from within the immediately preceding Set Day mode, the device will advance to the Start Time mode. While the mode button 36 remains pressed and for a brief delay following its release all available start time numerals will be displayed indicating all of the available start times (up to four start times daily per program may be set in the present embodiment). As soon as this brief delay expires, or if any one of the cursor buttons (left or right arrow, plus or minus) 40, 42, 44 and 46 is pressed before the delay expires, only the numerals for which a start time has been set will continue to display (that is, only for the 'active' start times within the current Program). The numeral "1" and the hour portion of start time number 1 are displayed in their flashing state. Note that if a selected start time is not being utilized (is 'inactive') then 'Off' will be displayed in place of an actual start time. Selected start time values are modified using the plus and minus buttons 44 and 46. In general, to facilitate and shorten the time it takes to reach a desired value, if either the plus or minus button 44 and 46 is held down for a short period when editing a value (referred to as 'scrolling') its rate of change will increase. The hour portion of the start time is set first, then the right arrow button 42 is used to select the minute portion, which then becomes the selected item and is displayed in a flashing manner. (Alternatively, this could be modified so that the hour and minute portion could be selected at the same time rather that setting each portion separately. In this case, in order to facilitate and shorten the time it takes to reach the desired start time, the minutes may change at an increased rate, for example in 5 minute increments, as the user scrolls through the twenty four hour period.) Pressing the right arrow button 42 again, when the minute portion of a start time is selected will advance the controller 10 to the next available start time.

Note that if a given start time is inactive, and the right arrow button 42 is pressed, the controller 10 will advance to the next available start time instead of the minute portion of the selected start time. If the last start time is selected and the right arrow button 42 is pressed, then the first start time will be selected. Similarly, the left arrow button 40 can be used to select a previous start time index and will wrap around to, or reselect the 4th start time if pressed while the first one is selected. If a start time is active and the plus and minus buttons 44 and 46 are pressed simultaneously, the programmed start time will remain in memory 26 however 'Off' will display in lieu of the saved but now disabled start time. If both buttons are once again pressed simultaneously the active start time will be restored from the memory 26. However, if the start time shows 'Off' and no valid start time value has been saved in the memory 26, then the start time will default to 12:00 am. An 'off' position is located between 11:55 am and 12:00 am. If the user is scrolling with the plus or minus button 44 and 46 and the 'Off' position is reached the scrolling will be interrupted at this point. In order to resume scrolling the user would first have to momentarily release the plus or minus button. At any time the user may press the mode button 36 to advance out of this mode and into the next mode and any changes will be saved to memory 26.

Multi-Program Capable Controller: The above description is directed to the process of programming a single watering schedule, or program, wherein run time values may be applied to one or more zones which will be activated in sequence beginning a at one or more start times per day on selected weekdays or according to a selected interval period. However, the irrigation controller 10 described herein provides for additional watering programs which are generally independent of one another, up to 3 Programs in the current embodiment (of course, other numbers of programs could be provided). Conceptually, one can imagine, in this case, three identical irrigation controllers mounted on a wall adjacent to one another and connected in an identical manner to the same water valves of a single sprinkler system. Consider that one program can be utilized, for example, to apply water to the zones which cover the grassed areas of the landscape according to one schedule, while another program can be used to water the flowerbeds according to an alternate, independent schedule. The first Program is referred to as program "A", while the alternate Programs are referred to as "B" and "C". The "PROGRAM" button 38 is used to access the alternate Programs. In any of the modes related to the setting up of a water schedule, pressing the Program button 38 will advance to the next available Program. For example, when reviewing the zone run times (watering durations) for Program "A", if the Program button 38 is pressed, the information provided in the LCD 34 will change to reflect the run time information for Program "B", and so on. In this example, when program A is the currently selected program, any zones assigned to this program will be indicated in the LCD 34. If the program button is pressed at this point, program B will be selected and the display will change to indicate the zones which have been assigned to program B. In a similar manner, whether in Delay mode, Budget mode, Start Time mode, or Active Day mode, information is provided in the display with respect to the currently selected program. This facilitates both the editing and reviewing of the scheduling information. If the Program button 38 is pressed while viewing program data for Program "C", Program "A" will be reselected. Multi Program capable controllers are well known in the art and this feature will therefore not be described in further details.

Manual Operation

The irrigation controller 10 provides for two means of manual operation: semi-automatic watering, which involves initiating the watering cycle of one or more existing Programs, and 'true' or single-zone manual operation wherein one or more specific zones are activated for a specified amount of time. The following information refers to the manual operation of a single Program or of a single zone. In some cases it could be possible to have more than one zone running at the same time. This situation will be discussed at a later point in this section.

Semi-Automatic watering: The controller is first be in Ready mode. Program button 38 is then pressed until the desired Program is indicated in the display. All zones included in the selected program are displayed. At this point simply pressing the plus button 44 will initiate the cycle for the selected program. The display will indicate the numeral of the activated zone and its amount of run time remaining. The sprinkler valve(s) 12 associated with this zone is (are) actuated for its programmed duration (or a percent factor of the programmed run time if budgeting is in effect). Upon the expiration of its run time period, the valve is deactuated and the next zone in the sequence, if any, is activated in turn. The plus and minus buttons 44 and 46 may be used to increase or decrease the remaining run time for a currently activated zone. If the user reduces its run time to less than 1 minute the zone will be deactivated and the next zone in the sequence will be activated.

If the left arrow button 40 is pressed while a cycle is in operation, watering activity will be suspended (paused). Pressing the right arrow button 42 after a pause has been initiated will cause the watering cycle to resume. However, if the system is already paused and the left arrow button 40 is pressed a second time the cycle will be cancelled and the system will return to Ready mode.

Pressing the right arrow button 42 while a zone is currently active will cancel the operation of that zone and the cycle will advance to the next zone of the current cycle. When the cycle is complete the system will return to Set Ready mode. Note that even when a cycle is operating it is still possible to access the other modes via the mode button 36. The only difference here is that in place of the Set Ready mode wherein the current time of day is shown, information relating to the current watering activity is displayed instead. A alternative would be to toggle every few seconds between showing the information related to current watering activity and the information typically provided in Ready Mode. If a user is returning to Ready Mode following Set Start Time mode, the current time of day will display upon entering Ready Mode shortly followed by the display of any ongoing watering activities.

Modified Semi-Automatic: This is nearly identical to semi-automatic watering however in this case the user is provided with the opportunity to make temporary changes to the programmed run time values prior to activating the cycle. In this case, instead of pressing the plus button 44 to begin the watering cycle, the right arrow button 42 is used to select the first zone within the chosen cycle. Its existing run time value may be modified with the plus and/or minus buttons 44, 46. Pressing the right arrow button 42 again will select the next zone within the cycle. A zone may be excluded from the semi-automatic cycle by reducing its applied time to zero. Similarly, pressing both the plus and minus buttons 44 and 46 simultaneously will remove the selected zone from the cycle. To initiate the cycle the user must reselect the arrow to the left of the row and then press the plus button 44. An alternative method for initiating a cycle would be for the first zone within it to be activated as soon as the user presses the right arrow button 42 to advance past the first zone of the cycle. The display changes at this point to provide information related to the current watering activity as described earlier.

Single Station Manual Operation: Single station (or single zone) manual operation does not involve the initiation of an existing program cycle, rather in this case the user may select and activate a specific zone. This is typically used when checking the sprinkler heads or drip lines which operate on a specific zone, when testing following repairs to a pipeline or sprinkler head, or when it is desirable to manually water only one particular area of the lawn or garden.

The controller is first in the Ready Mode. The Program button 38 is then pressed until 'MAN' appears in the display. With the arrow at the left of the row of zone numbers selected (flashing), the right arrow button 42 is pressed to advance to the zone which is to be activated. A specific amount of run time is then applied via the plus button 44. When the plus button 44 is first pressed, "on" will appear in the display and the zone will be activated. If the user continues to press the plus button 44, in place of the perpetual activation of the selected zone, an actual run time value can be applied and will appear in the display. If another zone is selected with the right arrow button 42, and the plus button 44 is then used to activate it before the currently active zone has completed its run time period (has not yet timed out), the current zone will be deactivated and the new zone will then be activated.

If the left arrow button 40 is pressed while a zone is under activation, all watering activity will be suspended (paused). Pressing the right arrow button 42 after a pause has been initiated will reactivate the zone to resume watering. However, if the system is already paused and the left arrow button 40 is pressed a second time then the manual operation will be cancelled and the system will return to Ready mode.

While under activation the run time value for the given zone can be modified via the plus or minus button. If reduced to zero, the zone will be deactivated. The user can select another zone to be activated, or press the Mode button 36 to cancel the manual session and return the device to the Ready Mode.

Initiating a test cycle: When 'MAN' is first selected, the arrow directly to the left of the zone numbers appears in a flashing state. As well, the word 'ALL' is displayed and an initial time value of 0 minutes is displayed. At this point the user may optionally initiate a test cycle which will activate all zones in sequence. The given amount of time is then applied via the plus button 44. As soon as the first minute of run time is applied via the plus button 44, the first zone will be activated. The user can continue to apply the desired amount of run time which will apply for all zones during the test cycle. Each zone will be activated in sequence until the test cycle has been completed. As described for semi-automatic operation, the user can pause, resume, advance, or cancel the cycle.

In general, whenever a scheduled watering cycle is occurring, or if a program cycle has been initiated manually, the LCD 34 will display information related to this activity. For instance, the display will show which zone is under activation and its remaining run time. Once a cycle has been initiated the device returns to Ready mode. The display may alternate every few seconds between displaying information typically shown in Ready mode, and displaying the information related to the current watering activity. As well, the mode button can still be used to enter the programming modes even while a watering activity is in effect.

Simultaneous Activation of Multiple Zones

The above description in regards to the manual activation of program cycles, or individual zones, was in reference to an embodiment of the controller which only permits the activation of one zone at a time. However, a variation of the above includes providing for the activation of more than one zone at a time. This is acceptable where the volume of water available to a given irrigation system is adequate for two or more zones to operate simultaneously. A given embodiment of the invention may be designed to allow for the simultaneous operation of more than one zone (and therefore more than one Program) at a time, up to a maximum number of zones that may be active at any given time, where it is acceptable to do so. This ability to have activated more than one zone at any given time would then apply to both manually activated watering activities as well as automatically initiated Program cycles or alternatively applies only to one of those.

In this case a second Program may be activated even while the first manually activated cycle is still in effect. When multiple cycles are simultaneously in effect, the display will momentarily show information related to each cycle. Use of the plus, minus, left or right arrow buttons 44, 46, 40 and 42 will apply to the cycle currently shown in the display. Note that in the case where a particular zone has been included in both cycles, and cycle B, for example, attempts to activate a zone which is already under activation by another cycle A, cycle B will instead immediately advance to the next zone, if any, in said cycle. With respect to the manual activation of individual zones, activating a second zone in this case will not automatically deactivate a previously activated zone. Multiple zones may, in this case, be activated and can operate concurrently up to a defined maximum for the particular embodiment. If the user proceeds to activate another zone and this maximum limit has already been reached then the lowest zone number of the active zones will first be automatically deactivated prior to activation of the newly selected zone. It would also be possible to just not allow any more zones to be activated once the maximum number that may be active at any given time has been reached. To view the amount of time remaining for any of the one or more activated zones the specific zone number can be selected via the left or right arrow buttons 40 and 42. The numeral of the currently selected zone is displayed in a flashing manner along with its remaining amount of run time. The plus and minus buttons 44 and 46 can be used to modify the amount of remaining run time for the selected zone. If its run time is reduced to zero the zone will be deactivated. If the mode button 36 is pressed all manually activated zones will be deactivated and the system will return to Ready Mode.

Start Time Stacking: It is possible, because of the number of start times provided for in the invention, that the user may inadvertently program the controller so that a second cycle is to begin before a previously initiated cycle has ended. In such a case the start times are said to overlap one another. Start time stacking is a method of handling overlapping start times. If, when a new cycle is scheduled to begin, a previously initiated cycle has not yet been completed, and the given embodiment provides for only one cycle to be active at any given time, the new cycle will be delayed until such time that the earlier cycle has been completed.

In many irrigation systems there is either an insufficient supply of water to provide for the operation of more than one zone at a time, or, the irrigation system itself has simply not been designed for this type of operation (for example, the size of the piping used to supply water to the valves 12 may only be capable of efficiently handling a limited volume of water sufficient for the operation of one zone at a time). Start time stacking prevents this potential problem by ensuring that the current cycle is allowed to reach completion before another another cycle can commence. So, for example if a scheduled cycle is to begin at 3:00 Am, but a previously initiated cycle has not yet reached completion, the second cycle will be delayed (and stacked in a queue) awaiting completion of the previously initiated cycle. However, if a cycle is stacked, and the first cycle has not yet been completed by 12:00 am, then any stacked cycles will be cancelled. One reason for this is to help prevent watering activity on a day when irrigation activities may not be permitted in the vicinity.

When programming the controller the user is advised to carefully check his or her scheduling in order to avoid overlapping start times (unless of course the system can accommodate them) which could lead to a zone being excluded from watering, or even the cancellation of an entire cycle. In order to avoid such potential problems, a specific embodiment of the controller 10 analyzes the programmed start times and provide a manner of indicating an overlap situation to the user. Furthermore, the device could indicate to the user the programs in which the overlap situation exists. Another solution, which could be combined with the above method, would be for the device to calculate the total run time of the selected cycle and display this value to the user. This would make it easier for the user to detect the overlap situation and then make the necessary schedule adjustments. The programming method of the Run Time mode could be amended to allow the user to select the arrow to the left of the row of zone numbers shown in the display and, when this item is selected, the total run time of the cycle would appear in the display.

Figure 6:
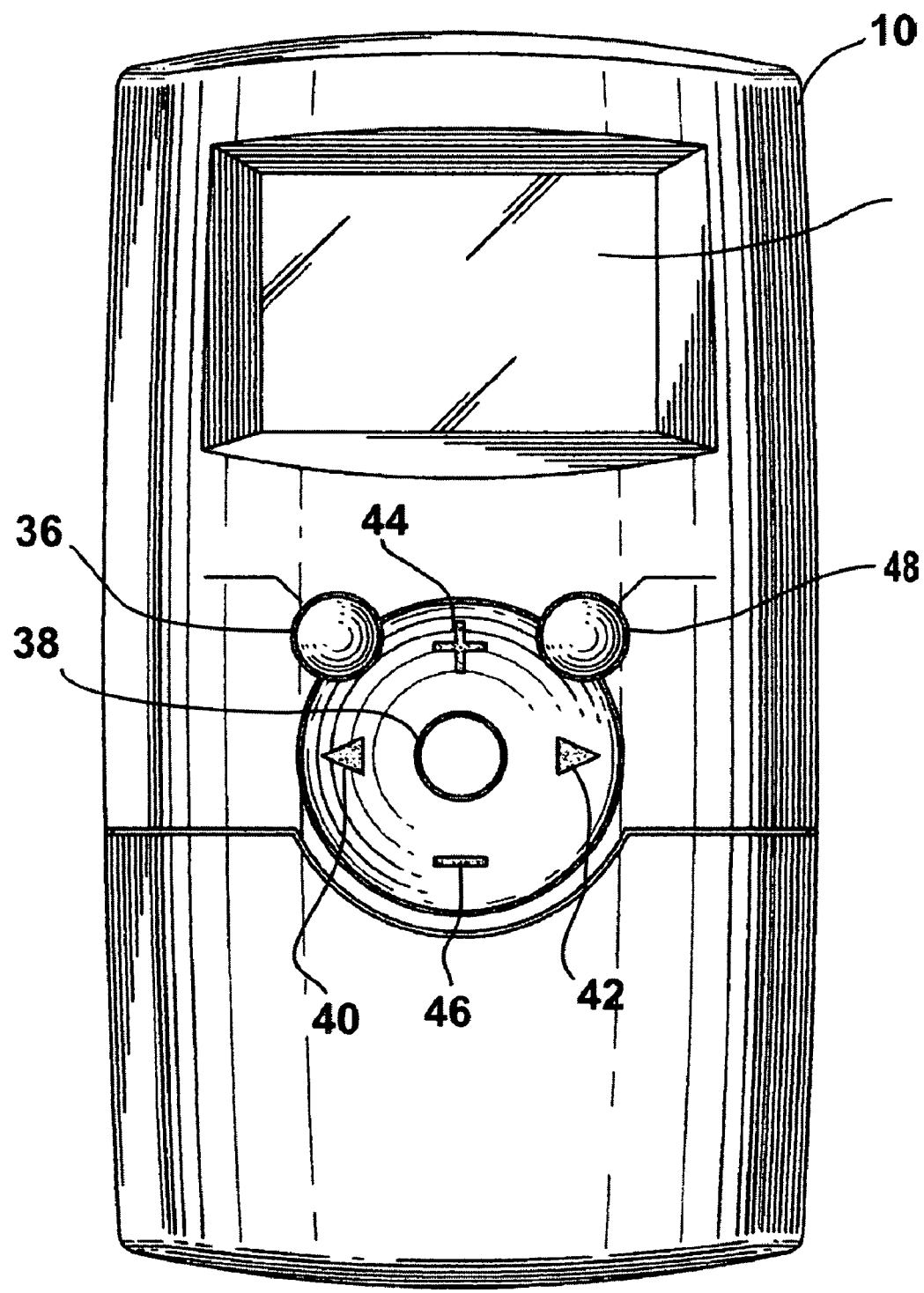
FIG. 6 is a front elevation view of an alternative irrigation controller.

FIG. 6 shows an alternative embodiment of the invention wherein a button 48 entitled Manual has been added. The Program button 38 remains but has been relocated. There are slight differences in the manner in which manual watering operations are initiated in this embodiment. In this case, a program cycle may be manually initiated in the following manner. First, from within Ready Mode, the Program button 38 is used to select a specific program to be activated. Pressing the Manual button 48 initiates the selected program. Alternatively, prior to initiating the cycle, the user may use the left and right buttons 40, 42, and plus and minus buttons 44, 46, respectively, to select and modify the run time values of one or more zones. The Manual button may then be pressed to initiate the temporarily modified program cycle.

In the case of the activation of one or more specified zones, from within Ready mode the Manual button 48 is pressed without the prior selection of a specific program. The arrow to the left of the row of zone numbers appears in a flashing manner. A test cycle may be initiated as described earlier. Or, the user may now select and apply run time to one or more zones using the left and right buttons 40, 42, and plus and minus buttons 44, 46, respectively. Pressing the Manual button 48 at this point will lead to sequential activation of all zones where a run time value has been applied.

Figure 7:
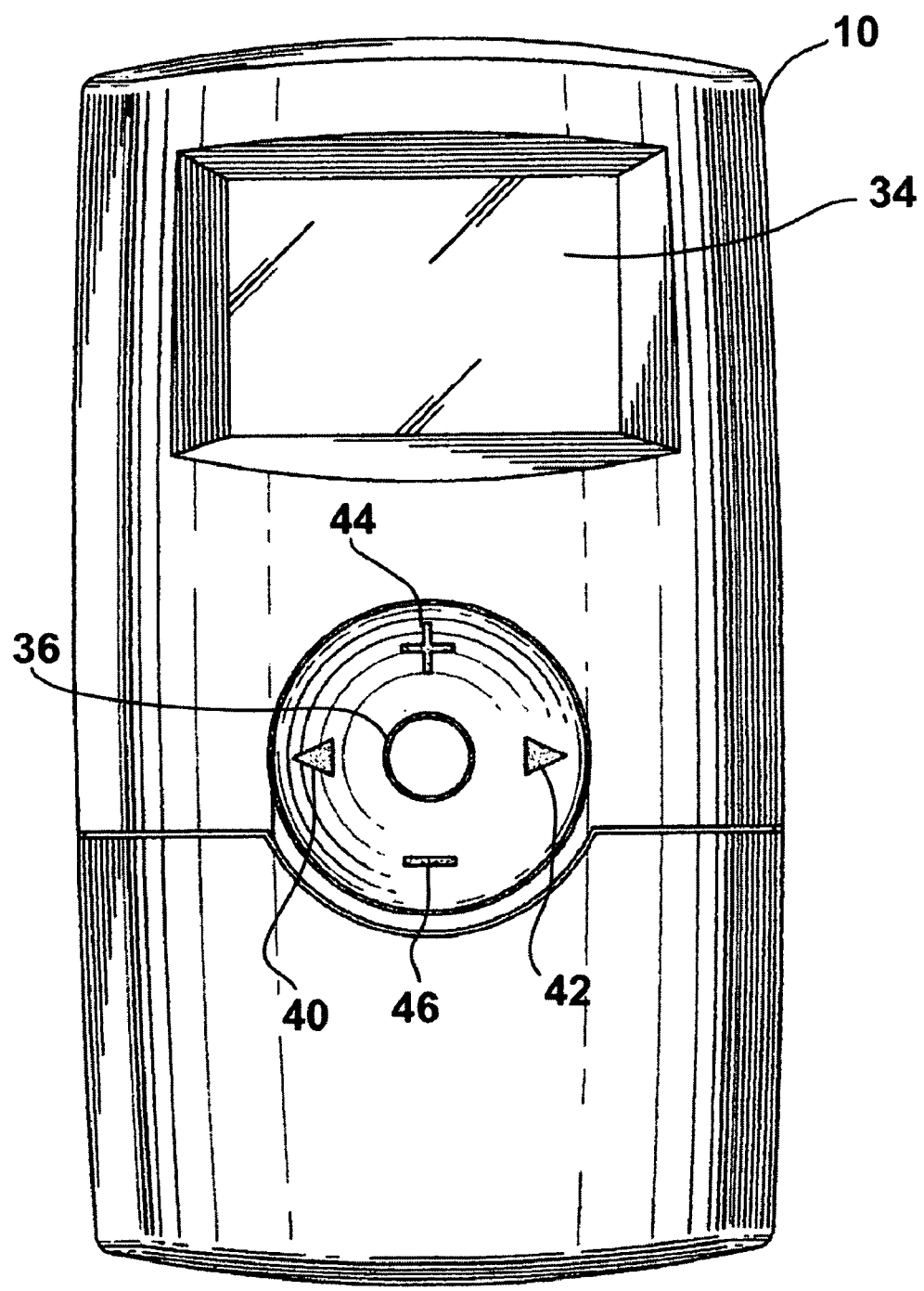
FIG. 7 is another front elevation view of an alternative irrigation controller.

FIG. 7 shows another alternative embodiment of the invention having a reduced number of buttons. A Program button is provided. If more than one program is available, the left and right arrow button may be used to select the desired program within the first program mode, for example this may be the set delay mode. The selected Program will continue to be the currently selected program for the remaining Program related programming modes (set budget, run time, active day, and start time modes).

As well, two additional modes, semi-auto and manual, are provided for this embodiment. From within semi-auto mode, the user can use the left and right arrow buttons 40, 42 to select a program for activation. The program may then be activated by pressing the Plus button 44. Alternatively, from within Manual mode a specific station may be selected using the left and right arrow buttons 40, 42. Applying a run time using the plus button will activate the selected zone. Additional zones may be activated to operate either sequentially or simultaneously depending upon the device's defined (or enabled) operational parameters.

Additional Features and Information

Supply of Power to the Invention

The present embodiment is suitable for the control of standard 24 volt ac solenoid valves widely utilized in the irrigation industry. Other embodiments could be adapted to control other types of valves 12, such as battery operated valves, or toggle type latching solenoids which change state whenever a voltage is briefly applied and therefore require no power to be maintained in the open or closed position. Power is supplied by means of a voltage reducing transformer (typically of the plug in variety) connected to the available ac line voltage.

The current embodiment of the invention can be operated in a limited fashion using only the backup battery installed in the housing 14. Although the controller 10 will not, generally, be able to operate the irrigation valves in this state, it could still be possible to carry out all of the programming tasks and or to review the existing data. (A given embodiment relying upon a smaller rechargeable battery located on the circuit board could possibly be operated in a similar fashion. If not, the sole purpose of the battery in that case would be to maintain the current date and time information in case of a loss of external power.) In an alternate embodiment designed to operate specialized low voltage valves it could be possible to operate such valves on battery power (either from the internal battery or using an external battery) or possibly, solar power, alone. In any case, programmed data is stored in non-volatile memory and can be maintained for an extended period of time without any internal or external source of power. In general, being able to setup the irrigation controller 10 without the need for an external power source makes it possible for the homeowner or contractor to completely program the device prior to installation.

Battery Back-up

In case of a loss of ac power the programmed data will be stored in non-volatile memory capable of maintaining this information for an extended period of time. A battery, either located on the circuit board itself, or in a particular location within housing 14 of the device, will be used to maintain the current time of day and date until such time that the external power has been restored (or the battery has been depleted).

Expandability of the Irrigation Controller

The present embodiment is capable of operating an irrigation system comprising up to twelve zones (but other numbers of zones, and for that matter, start times as well, could be supported in a particular embodiment). There is a connection point on the terminal strip for each zone. Note that there is a connection on the terminal strip to accommodate a master valve and/or pump relay (to operate an electric pump for installations where water is provided from a nearby lake or well, or when an electric booster pump is used to raise the capacity of the available water supply).

However, it would be possible to have an embodiment of the invention incorporating a relatively simple means whereby the number of zones the device is capable of operating could be increased beyond the initial number. For example, such an embodiment could be initialized to control a relatively small number of zones, perhaps four zones, yet could be upgraded (expanded) to control a greater number of zones, up to a certain maximum number, were it to become desirable for a particular controller to accommodate more irrigation zones. Some existing controllers provide for the installation of specialized modules in order to increase the number of zones the controller can accommodate. Such modules generally contain some or all of the additional components which are required to expand the capability of the controller.

A different approach presented here would be to provide an embodiment of the invention which could be upgraded (or, expanded) in one of the following manners. One method would be to provide a receptacle on the invention wherein a small electronic 'chip' (or similar type of component, or module, etc.) could be inserted (or in some similar manner attached to the controller) in order to enable a specific number of additional zones, depending on the information provided by the chip.

As mentioned hereinabove, the system could be upgraded by entering a unique 'code' by pressing the existing keypad buttons 36-46 in a specially prescribed manner in order to enable the additional zones (and possibly additional start times and/or other features). One means to facilitate entering the appropriate 'code', which could be expressed as a series of numbers, would be to provide an overlay, or merely an illustration, which would assign a unique numeric digit to each keypad button.

Regardless of the manner used to activate the additional zones, additional positions on the terminal block would be required to connect to the wiring leading to the additional valves. (Note that if a two-wire system is being used in the particular embodiment then this would not be necessary, and instead only additional decoders would be required. This method is described in a later section below.) The expandable embodiment would either already be equipped with all of the terminal connection points already installed, or, a modular terminal block could be used wherein the available valve connection points would already exist (in the form of a terminal connector header) and it would only be required to attach the appropriate, corresponding terminal block plug portion of the modular terminal block system so that the wires leading to the additional valves could be connected to the invention.

Automatic Detection of Utilized Zones

In some cases an irrigation controller may be capable of operating a greater number of zones than are currently required for a given installation. Typically when programming the controller, any unused zones are simply set to off. In the current invention, when reviewing or editing the run time data, the unused zones will appear in the display and can be selected. A feature suggested here, which is present in some embodiments of the invention, would be to provide a means of determining which, if any, of the zone connection points on the terminal block are not connected to one or more valves, that is, which zones are currently not being used. Each time a test cycle is run (as described under the heading Manual Operations), prior to the activation of each zone the controller 10 would determine whether the electrical resistance of the output for the particular zone is consistent with that output being connected to one or more valves, or whether the circuit is open, suggesting that the zone is not being used. Any zones which are determined to be unused at this time would no longer be displayed in Run Time mode and would automatically be set to off.

Demonstration Mode

In some embodiments of the invention, the irrigation control program 200 implements a demonstration mode allowing the user to operate the irrigation controller 10 without requiring that the irrigation controller is connected to the sprinkler valve stations 12.

More specifically, in a manner similar to that described above with regards to being able to program the controller while no external power is being supplied, the device is initially set to a special demonstration mode wherein it can be operated in a limited fashion, such that a potential user of the product could evaluate it prior to making the decision to purchase it. To this end, the controller 10 would be packaged in such a manner that the buttons 36-46 would remain accessible. In order to conserve power, while in this demonstration mode either no information, or a minimal amount of information would be displayed in the LCD 34, with the device effectively in a very low power usage state until such time that a keypad button 36-46 were to be pressed, at which point the device would become operational with respect to most of the tasks related to programming the controller, and those involved in initiating manual watering activities. After a relatively short time, one or two minutes for example, during which no button presses have been detected, the controller 10 would return to its very low power usage state. Once the consumer obtains the product a simple means would be provided to exit the demonstration mode. For example, the demonstration state could be deactivated by connecting the device to an external power source. Another means could be for the user to hold down a keypad button 36-46 for a brief period of time. The exact manner would be described in the documentation accompanying the irrigation controller 10.

Fault Detection

In the case of a short circuit or other detectable fault along the wiring to one of the valves 12 or within the valve 12 itself, the electrical activation of the zone in question will be interrupted and watering will advance to the next zone in the cycle. If there are no more zones to be activated the cycle will end. The display will alternate every few seconds between displaying the current watering activity and identifying the zone on which the fault has occurred.

When the cycle has been completed and the controller 10 is in the Ready Mode, the fault information will periodically be displayed in lieu of the time of day being normally shown in this mode until such time that another cycle or manual watering activity is initiated. Provided the fault has been corrected, the valve(s) associated with this zone will operate normally the next time the device attempts to activate it.

Remote Control Operation

In a related embodiment of the invention an irrigation cycle or a particular zone is activable through the use of a battery operated remote control transmitter. The controller 10 would be so constructed as to be able to receive the signals from the remote control device and respond by activating the valve(s) 12 of a zone which has been selected via the remote control. If required, a special connection socket is provided on the controller 10 whereby an antennais mounted to increase the range of communication between the receiver (the irrigation controller 10) and the remote transmitter. The transmitter, which may be compact in size, enables the owner, persons in charge of maintaining the system, or a contractor servicing the system to selectively test the operation of the zones from a distance without having to repeatedly travel to and from the controller 10 in order to activate a particular zone, pause or cancel its operation, or activate another zone. Enablement of remote control operation is another example of a limited access functionality.

A Virtual Controller

In the course of designing the invention referred to herein, a computer simulation of the physical device was created in order to explore a number of variations with regards to the organization of the buttons 36–46, methods of inputting the data, the organization of the information displayed in the LCD 34, and the steps by which manual water operations are initiated. The simulated controller was connected to an actual sprinkler system via an interface board linking the computer on which the simulation was installed, via the interface, to an actual sprinkler system. It is conceivable that the simulated version of the controller 10 whose operation is consistent with the description provided above for the physical, typically wall mounted product, could exist in its own right as a viable irrigation controller 10. Furthermore, it is conceivable that the simulated on screen control panel could be integrated, perhaps through a home networking system or some other, either similar, or alternative means of communication, to the physical irrigation controller 10 herein described. It would then be possible to modify or review the programmed information using a personal computer, or via communication with the device from a remote location over the internet.

Looking at the situation in the reverse, it is also possible that the programmed data could reside on the networked computer directly or indirectly connected to a physical embodiment of the irrigation controller 10. The physical embodiment could then be used to access information maintained by the computer, and provide a means of accessing the system via the irrigation controller 10 which may be located outdoors, in the garage, or in the basement or any other suitable location. This would facilitate access to the system from a convenient location other than from a standalone or networked computer interface.

Automatic Detection of Utilized Zones

In some cases an irrigation controller 10 is capable of operating a greater number of zones than are currently required for the given installation. Typically when programming the controller 10 in such as case, any unused zones are simply set to off. In the current invention, when reviewing or editing the run time data, the unused zones will appear in the display and can be selected. A feature suggested here, which is present in some embodiments of the invention, is to provide a means of determining which, if any, of the zone connection points on the terminal block are not connected to one or more valves, that is, which zones are currently not being used. Each time a test cycle is run (as described under the heading Manual Operations), prior to the activation of each zone the controller 10 would determine whether the electrical resistance of the output for the particular zone is consistent with that output being connected to one or more valves, or whether the circuit is open, suggesting that the zone is not being used. Any zones which are determined to be unused at this time would no longer be displayed in Run Time mode and would automatically be set to off.

When a Rain Sensor is Connected to the Invention

In some embodiments of the invention, an electronic or electromechanical rain sensing apparatus, or rain sensor, is connectable to the controller via two terminal connection points on the terminal block. In many installations utilizing a rain sensor device, the sensor is incorporated into the system in such a manner so as to directly interrupt the flow of electricity (acting as an interrupt switch, typically breaking the common wire connection) to the valves once a predetermined amount of rainfall has been detected within a recent time period. With a rain sensor connected in this manner, it would not be possible to operate the irrigation system so long as the interrupt is being maintained by the sensor. Of course, the sensor will eventually reset within a period once the rain has stopped. There are times however, when it may be desirable to operate the system regardless of the current state of the sensor, for example if the system is being serviced during, or, more likely, immediately following an amount of precipitation sufficient to inhibit the activation of the valves 12. In such a case it may be necessary to override, or bypass the sensor. In some installations, the only way to accomplish this would be to physically access the sensor and manually restore the circuit (the device can temporarily be adjusted to its maximum precipitation setting, or in the case of a sensor which utilizes a collector of some type to ascertain the amount of precipitation, the collector can be emptied). This approach is generally not very practical since the most suitable locations for installing a rain sensor are often along the edge of a roof or high enough on some structure that a ladder would be required to access the device.

One means around this difficulty is to install a bypass switch adjacent to the controller 10 which, when activated, will allow the system to operate regardless of the state of the rain sensor. While this method is of course significantly better than having to access the sensor directly, it may also add to the complexity of the irrigation system.

On the other hand, with a rain sensor connected directly to the invention, the irrigation controller 10 can take current state of the sensor into account immediately prior to initiating a programmed watering cycle. Under manual operation, a single zone can be activated, or a complete cycle initiated, regardless of the state of the sensor. And should it be necessary to do so, the sensor could be bypassed directly from the controller 10 in the manner described earlier in the application. Furthermore, the current state of the sensor could then be monitored by the controller 10 and indicated in the display.

Typically an adjustment is required to the rain sensor itself in order to set the level of precipitation at which watering is to be inhibited. It would, however, be considerably more convenient if the precipitation setpoint (at which watering would be inhibited) could be adjusted from the irrigation controller 10 itself (or possibly a specialized device located adjacent to the controller). This would likely result in more efficient use of the available water resource. One reason for this is that when the sensor itself is not readily accessible, the setpoint is often set higher than is actually required, both to ensure that sufficient irrigation will be provided, and to avoid having to readjust the sensor in the case where the setpoint (threshold) was not set high enough.

A possible means of achieving this would be to utilize a sensor apparatus which would provide a measurable resistance (or capacitance, or other measurable electrical characteristic) which would vary in a predictable manner (possibly proportionally) with respect to the amount of precipitation detected. An initial reading could be taken of the electrical resistance (for example) between the controller and the sensor, presumably (but not necessarily) when the sensor is in a 'dry' state in order to determine a base voltage under this condition. A special programming mode would be provided wherein a) this initialization procedure could be carried out and b) the user could select the desired precipitation level at which watering is to be inhibited. A suitable range could be provided wherein a desired level of precipitation, expressed in millimeters or fractions of an inch, could be selected. Alternatively, an adjustable switch (fixed position or variable type) for setting the inhibitory threshold point could be located on the lower portion of the invention, behind the cover plate/access panel and in the area adjacent to the terminal block.

Integrated Control of Outdoor Lighting

Outdoor lighting, or landscape lighting, has become increasing popular in recent years. There are a number of light controller devices available to operate outdoor lighting. However, a given irrigation controller 10, particularly a multi-program capable one (as is the current invention), having at least one unused zone, that is, a zone which is not required for the operation of any irrigation valves, could, theoretically, be used to operate outdoor lighting. In place of the irrigation valve(s) normally connected to the output terminal of this zone, a switching relay device compatible with the control voltage of the zone control circuit could be connected. A program could be set up to activate and deactivate such a switching device according to a user defined schedule, that is, to turn the lights on and off at predetermined times.

With respect to the invention, if there is at least one unused program available, and at least one unused zone available, a schedule could be created to operate any outdoor lighting equipment that may be installed on the property. Of course, the irrigation controller 10 would have to provide for run times having a duration of several hours. The available program could be scheduled to activate an available zone at a given time, on selected days of the week, for a certain amount of time (typically an extended time of several hours).

However, a particular embodiment could also feature one or more additional Programs more specifically designed for and better suited to the purpose of controlling outdoor lighting. The actual method for the programming of a lighting schedule would be very similar to that followed when setting up an irrigation Program, or cycle, as described earlier in this application, with some modification, in the manner described below. In this case, it might be suitable to have a LCD differing slightly from the LCD 34 and which includes segments directed to displaying information specific to lighting. It would also be feasible to have the relevant segments already incorporated into the LCD 34 so that they are already available should this feature become enabled in the manner presented herein for upgrading the controller.

The lighting program is then selected in the same way that any of the irrigation programs are selected, using the Program button 38. So in case of a device having three irrigation programs and a single lighting program, the Program button would be pressed repeatedly until the lighting program is selected. In a specific embodiment, the lighting program is identified as L1, and when selected, 'L1' (or a symbol, such as a light bulb, could be used instead) would appear in the display as the s(in a flashing manner if the other program identifiers are shown as well in order to indicate its selection).

With the lighting program selected, the display indicates the type of scheduling that will be used. The two possible settings are 'Off', to disable automatic lighting control by the currently selected program, and "Auto", to have the lights operated according to the user defined schedule. An additional setting, "Clock" (or some appropriate name) could be provided which would allow the user to specify on and off times for the activation and deactivation of the light program. If the embodiment provides for the operation of the lights in conjunction with an external light sensor, an additional setting, "Snsr" would be available to enable this feature. Once the appropriate setting is applied via the plus and/or minus buttons 44 and 46, the user must press the mode button 36 to advance to Run Time mode.

In Runtime mode, with program L1 selected, the duration for which the lights are to remain activated for a given zone are set using the plus and minus buttons 44 and 46. The lighting program provides for extended activation times up to 24 hours. Note that only a zone that has not already been assigned to an irrigation program can be included in the light program. If a zone is already assigned to an irrigation schedule, when that zone is selected, dashes could appear in the time portion of the display, for example, or, alternatively, the numeral for the zone would not be displayed.

In Day Mode, the user may select the days upon which the light cycle is to operate in a manner similar to that followed when scheduling an irrigation cycle. The Interval type of scheduling option could be retained, however the odd/even day interval option would not be available for the lighting program in a specific example of implementation.

In Start Mode, the user may set the start time at which the zones assigned to the lighting schedule are to be activated. (At least one start time will be provided for, however it would be possible to offer more than one start time.) Unlike an irrigation cycle, where the zones assigned to a given program activate in sequence, the zones assigned to the lighting program are activated simultaneously. From that point, each zone included the program will remain activated for its programmed duration. (If the "Clock" option has been selected for the given light program, then in place of setting a start time, the on time would be set at this point. The mode button 36 would then be pressed to display the off, or deactivation time of day.) Following the application of one or possibly more start times (or on and off times), the mode button 36 is pressed to return to Ready mode.

The budgeting and delay features could be retained, and would operate in the same manner as described earlier in regards to the programming of an irrigation schedule, however they may not be as relevant with respect to the control of lighting.

Manual Operation of Lighting Equipment

In a manner similar to that described for the manual operation of an irrigation program, or individual zone, a lighting program can be initiated or an individual lighting zone activated. However, when a lighting program is initiated, all zones included in it are activated simultaneously. Each zone will then remain activated for its programmed duration. Alternatively, an individual zone which has been assigned to a light program can be selected and activated in the same manner described for the activation of an individual irrigation zone.

Light Sensor

A particular embodiment may offer the added capability of integrating an external light sensor to signal the activation and deactivation of one or more light programs. Two additional connection points would be provided on the terminal block for connecting a light sensor to the invention. When a light program is selected, an additional setting would be provided to enable the activation and deactivation of the lights according to the information provided by the controller 10 (as described above). The user could still select the active days for the program, however a start time ('on time') and duration for each zone would become extraneous and need not be set in this case. Instead of including a zone in the program by assigning a run time duration (amount of activation time), in this case the plus and minus buttons 44 and 46 are used, respectively, to include or exclude the zone from the current program.

Adjusting the Effective Sensitivity of a Light Sensing Device Connected to the Invention In some outdoor lighting installations, a light sensing device (photo sensor or photo cell) is used to determine when the lighting circuit is to be activated and deactivated according the level of daylight detected by the sensor. A particular embodiment of the invention could operate a light program, or a particular zone used in the operation of the outdoor lighting, according to information provided by a light sensor connected directly to the controller. In this case, two terminal connection points on the terminal block would be required for connecting the light sensor to the controller. A manner for adjusting the light sensing device from the controller itself could be provided, as opposed to having to make this type of adjustment on the sensor itself. Changes in the voltage or the resistance across the sensor would be monitored by the controller. A special mode could be provided wherein which the threshold point of the sensor could be adjusted from a scale of one to ten (or something similar to this). As the threshold setting is increased, the activation of the outdoor lighting is delayed, that is, the lights would generally not be activated until a later time of day when there is less available daylight to be detected by the sensor, and the lights would come on later in the day (and, presumably, turn off earlier in the morning). Alternatively, an adjustable switch or potentiometer, located on the controller, and accessible with the access panel in the open position (or removed), could be used to adjust the sensitivity, and therefore, the threshold point of the sensor. The method for remotely adjusting the threshold point at which the lighting zone is to be activated or deactivated, would be similar to that described earlier with respect to a rain sensor connected directly to the controller.

In a manner similar to that described earlier in this application regarding an embodiment capable of being upgraded (expansion of the number of zones, implementation of additional features), an upgradable embodiment of the irrigation controller, not already supporting this capability, could be upgraded so as to control outdoor lighting equipment with the addition of one or more programs tailored to the control and operation of such equipment. For example, in a given embodiment the LCD could be produced with the appropriate segments already incorporated should it become desirable at some point to optionally upgrade a previously installed controller to support one or more lighting. For example, segments could be incorporated into the lcd 34 display to represent one (or more) lighting programs, were the controller to be upgraded to support them.

Alternative Input Devices

Also, it is within the scope of the invention to have input devices 18 differing from the above-described input devices. For example, in some embodiments of the invention, the input device 18 includes a microphone. In this case, predetermined input allowing to enable the specific functionality includes a predetermined sequence of sound signals received by the microphone. This sequence of sound signals is sent over a telephone network to a telephone provided in proximity to the microphone, is produced by a dedicated device provided in proximity to the microphone, or is produced in any other suitable manner.

In another example, the input device 18 includes a network interface connectable to a remotely located computer. Examples of such network interface include a TCP/IP interface and an X10 interface, among others. In this example, the predetermined input includes a predetermined signal received from the remotely located computer through the network interface.

In yet another example, the input device 18 includes an image input device, such as a camera of a bar-code reader. In this example, the predetermined input includes a predetermined image presented to the image input device.

In yet another example, the input device 18 includes an infrared receiver. In this example, the predetermined input includes a predetermined infrared signal received by the infrared receiver.

In yet another example, the input device 18 includes an electrical port, such as a USB port or any other suitable port, that receives an input module including electronic components. The predetermined input includes a predetermined electrical signal received by the electrical port from the input module. For example, the input module includes a memory containing the predetermined input.

In a specific embodiment of the invention, if the card is removed, the enabled functionality is disabled. Then, the predetermined input does not necessarily need to be associated with the predetermined input.

Although the present invention has been described hereinabove by way of preferred embodiments thereof, it can be modified, without departing from the spirit and nature of the subject invention as defined in the appended claims.

What is claimed is:

1. An irrigation controller for selectively turning on and off a set of sprinkler valve stations, said irrigation controller being programmable by a user, said irrigation controller comprising:
   a. an irrigation control processor, including
      i. an input port;
      ii. an output port;
      iii. a memory element for storing an irrigation control program and irrigation control parameters, said irrigation control program implementing a plurality of functionalities, each functionality controlling at least in part the turning on and off of the sprinkler valve stations;
      iv. a processing unit for executing said irrigation control program; and
      v. a bus connecting said processing unit to said memory element and to said input and output ports;
   b. an input device interfaced with said input port;
   c. said output port being provided for interfacing with the sprinkler valve stations for controlling the turning on and off of said sprinkler valve stations;
   d. said input device cooperating with said control program to allow said intended user to upgrade said irrigation controller by entering through said input device a predetermined input representative of a predetermined code, said predetermined code being specific to said irrigation controller;
e. wherein a larger number of functionalities are enabled in said irrigation controller after said irrigation controller has been upgraded than before said irrigation controller is upgraded.

2. An irrigation controller as defined in claim 1, wherein upgrading said irrigation controller includes enabling at least one specific functionality from said functionalities, said specific functionality including controlling a first subset of sprinkler valve stations from the set of sprinkler valve stations.

3. An irrigation controller as defined in claim 2, wherein:
a. said control program controls a second subset of sprinkler valve stations disjoint from the first subset of sprinkler valve stations before said irrigation controller is upgraded; and
b. said control program controls both the first and second subsets of sprinkler valve stations after said irrigation controller has been upgraded.

4. An irrigation controller as defined in claim 3, wherein said irrigation controller comprises a plurality of control devices connected to said control port, each of said control devices being for controlling the turning on and off of a respective one of said sprinkler valve stations.

5. An irrigation controller as defined in claim 4, wherein said controller includes a number of control devices able to control both said first and second subset of sprinkler valve stations, thereby allowing the user to increase a number of sprinkler valve stations controlled by said irrigation controller without requiring the addition of control devices to said irrigation controller.

6. An irrigation controller as defined in claim 3, wherein:
a. said input device includes a keypad; and
b. said predetermined input includes a predetermined key sequence.

7. An irrigation controller as defined in claim 3, wherein:
a. said input device includes a keypad;
b. said controller further comprises a display port and a display device each interfaced with said display port;
c. said bus connects said processing unit to said memory element and to said display, input and output ports; and
d. said predetermined input includes entering a predetermined sequence of symbols through said keypad, said keypad allowing the selection of said symbols from a predetermined set of symbols by displaying in sequence said set of symbols onto said display in response to a first predetermined key from said keypad being pressed by the user and by selecting a symbol as being entered in response to a second predetermined key from said keypad being pressed by the user.

8. An irrigation controller as defined in claim 3, wherein:
a. said input device includes a network interface connectable to a remotely located computer; and
b. said predetermined input includes a predetermined signal received from said computer through said network interface.

9. An irrigation controller as defined in claim 3, wherein:
a. said input device includes a microphone; and
b. said predetermined input includes a predetermined sequence of sound signals received by said microphone.

10. An irrigation controller as defined in claim 3, wherein:
a. said input device includes an image input device; and
b. said predetermined input includes a predetermined image presented to said image input device.

11. An irrigation controller as defined in claim 3, wherein:
a. said input device includes an infrared receiver; and
b. said predetermined input includes a predetermined infrared signal presented to said infrared receiver.

12. An irrigation controller as defined in claim 3, wherein:
a. said input device includes an electrical port; and
b. said predetermined input includes a predetermined electrical signal received by said electrical port.

13. An irrigation controller as defined in claim 1, wherein upgrading said irrigation controller includes enabling at least one specific functionality from said functionalities, said specific functionality being a limited access functionality that should be enabled only when an authorized user uses said irrigation controller.

14. An irrigation controller as defined in claim 1, wherein:
a. upgrading said irrigation controller includes enabling at least one specific functionality from said functionalities,
b. said predetermined input is a first predetermined input; and
c. said input device cooperates with said control program to disable said specific functionality in response to a second predetermined input being received from the user through said input device.

15. An irrigation controller as defined in claim 1, wherein upgrading said irrigation controller includes enabling at least one specific functionality from said functionalities, said specific functionality being automatically disabled after a predetermined time interval further to the enablement of said specific functionality.

16. An irrigation controller as defined in claim 1, wherein upgrading said irrigation controller includes enabling at least one specific functionality from said functionalities, said specific functionality being selected from the set consisting of: allowing a water management functionality whereby a base time sequence of activation of sprinkler valve stations is globally altered through a global parameter; allowing the activation and inactivation of a light using said irrigation controller; allowing an adjustment of activation times for each sprinkler valve station in response to a control signal received from a rain sensor; allowing an entry of additional start times at which each sprinkler valve station is activated; adding an alternate sensing functionality whereby an adjustment of activation times for each sprinkler valve stations performed in response to a control signal received from an evapotranspiration sensor; adding a rain delay functionality wherein irrigation is suspended further to an entry of a time delay Into said irrigation controller; and allowing to control the turning on and off of a master pump connected to said irrigation controller and in fluid communication with the sprinkler valve stations so that water flows to the sprinkler valve stations only if the master pump is turned on.

17. An irrigation controller as defined in claim 1, further comprising a display port and a display device each interfaced with said display port, said bus connecting said processing unit to said memory element and to said display, input and output ports; wherein said input and display devices cooperate with said control program to sequentially prompt the user to enter a value for each of the irrigation control parameters, thereby defining a sequence of irrigation control parameters, each irrigation control parameter being prompted for in response to the user indicating that a preceding control parameter in said sequence of control parameters is correctly entered.

18. An irrigation controller as defined in claim 17, wherein the user is prompted for a given control parameter only if the control parameter is associated with a functionality selected from the set including a functionality provided by default with said controller and a functionality that has been previously enabled.

19. An irrigation controller as defined in claim 1, wherein the predetermined input is at least in part determined by a predetermined identifier associated with said irrigation controller.

20. An irrigation controller as defined in claim 1, wherein said irrigation control program implements a demonstration mode allowing the user to operate said irrigation controller without requiring that said irrigation controller is connected to the sprinkler valve stations.

21. A method for upgrading an irrigation controller by enabling a specific functionality from a plurality of functionalities in the irrigation controller, said method comprising the steps of:
   a. receiving a user input representative of a predetermined code, said predetermined code being specific to said irrigation controller;
   b. comparing the user input to a predetermined input; and
   c. upon the user input being identical to the predetermined input, enabling the specific functionality;
   d. wherein a lamer number of functionalities are enabled in said irrigation controller after said irrigation controller has been upgraded than before said irrigation controller is upgraded.

22. A computer readable storage medium containing a program element for execution by a computing device for selectively turning on and off a set of sprinkler valve stations, said program element comprising:
   a. a plurality of function modules each implementing a respective functionality that is selectively enabled;
   b. an input module for receiving inputs from an input device;
   c. an output module for Interfacing with the sprinkler valve stations for controlling the turning on and off of the sprinkler valve stations;
   d. a master module for enabling and disabling the functionalities implemented by said function modules, said master module being operative for upgrading the program element by enabling at least one specific functionality from the functionalities in response to a predetermined input being received by said input module, the predetermined input being representative of a predetermined code specific to at least one of: said computer readable storage medium, said program element and the computing device;
   e. wherein a larger number of functionalities are enabled in said program element after said computing device has been upgraded than before computing device is upgraded.

* * * * *